US009818425B1

(12) United States Patent
Ayrapetian et al.

(10) Patent No.: US 9,818,425 B1
(45) Date of Patent: Nov. 14, 2017

(54) PARALLEL OUTPUT PATHS FOR ACOUSTIC ECHO CANCELLATION

(71) Applicant: Amazon Technologies, Inc., Seattle, WA (US)

(72) Inventors: Robert Ayrapetian, Morgan Hill, CA (US); Philip Ryan Hilmes, San Jose, CA (US); Wai Chung Chu, San Jose, CA (US); Hyeong Cheol Kim, Irvine, CA (US); Yuwen Su, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/185,799

(22) Filed: Jun. 17, 2016

(51) Int. Cl.
| | | |
|---|---|---|
| *G10L 21/0224* | (2013.01) | |
| *G10L 15/30* | (2013.01) | |
| *G10L 25/84* | (2013.01) | |
| *G10L 21/0208* | (2013.01) | |
| *G10L 21/0216* | (2013.01) | |
| *G10L 15/22* | (2006.01) | |

(52) U.S. Cl.
CPC .......... *G10L 21/0224* (2013.01); *G10L 15/30* (2013.01); *G10L 25/84* (2013.01); *G10L 2015/223* (2013.01); *G10L 2021/02082* (2013.01); *G10L 2021/02166* (2013.01)

(58) Field of Classification Search
USPC ................... 704/231–257, 270–275
See application file for complete search history.

(56) References Cited

U.S. PATENT DOCUMENTS

| | | | | |
|---|---|---|---|---|
| 2012/0158404 | A1* | 6/2012 | Shin .................... | G10L 21/0216 704/233 |
| 2012/0224715 | A1* | 9/2012 | Kikkeri .................. | H04R 3/005 381/92 |
| 2013/0030803 | A1* | 1/2013 | Liao ....................... | G10L 15/20 704/233 |
| 2014/0025374 | A1* | 1/2014 | Lou ..................... | G10L 21/0216 704/203 |
| 2014/0056435 | A1* | 2/2014 | Kjems .................. | H04M 9/082 381/66 |
| 2014/0136195 | A1* | 5/2014 | Abdossalami .......... | G10L 15/26 704/235 |

\* cited by examiner

*Primary Examiner* — Jesse Pullias
(74) *Attorney, Agent, or Firm* — Pierce Atwood LLP

(57) ABSTRACT

An echo cancellation system that generates multiple output paths, enabling Automatic Speech Recognition (ASR) processing in parallel with voice communication. For single direction AEC (e.g., ASR processing), the system prioritizes speech from a single user and ignores other speech by selecting a single directional output from a plurality of directional outputs as a first output path. For multi-directional AEC (e.g., voice communication), the system includes all speech by combining the plurality of directional outputs as a second output path. The system may use a weighted sum technique, such that each directional output is represented in the combined output based on a corresponding signal metric, or an equal weighting technique, such that a first group of directional outputs having a higher signal metric may be equally weighted using a first weight while a second group of directional outputs having a lower signal metric may be equally weighted using a second weight.

24 Claims, 13 Drawing Sheets

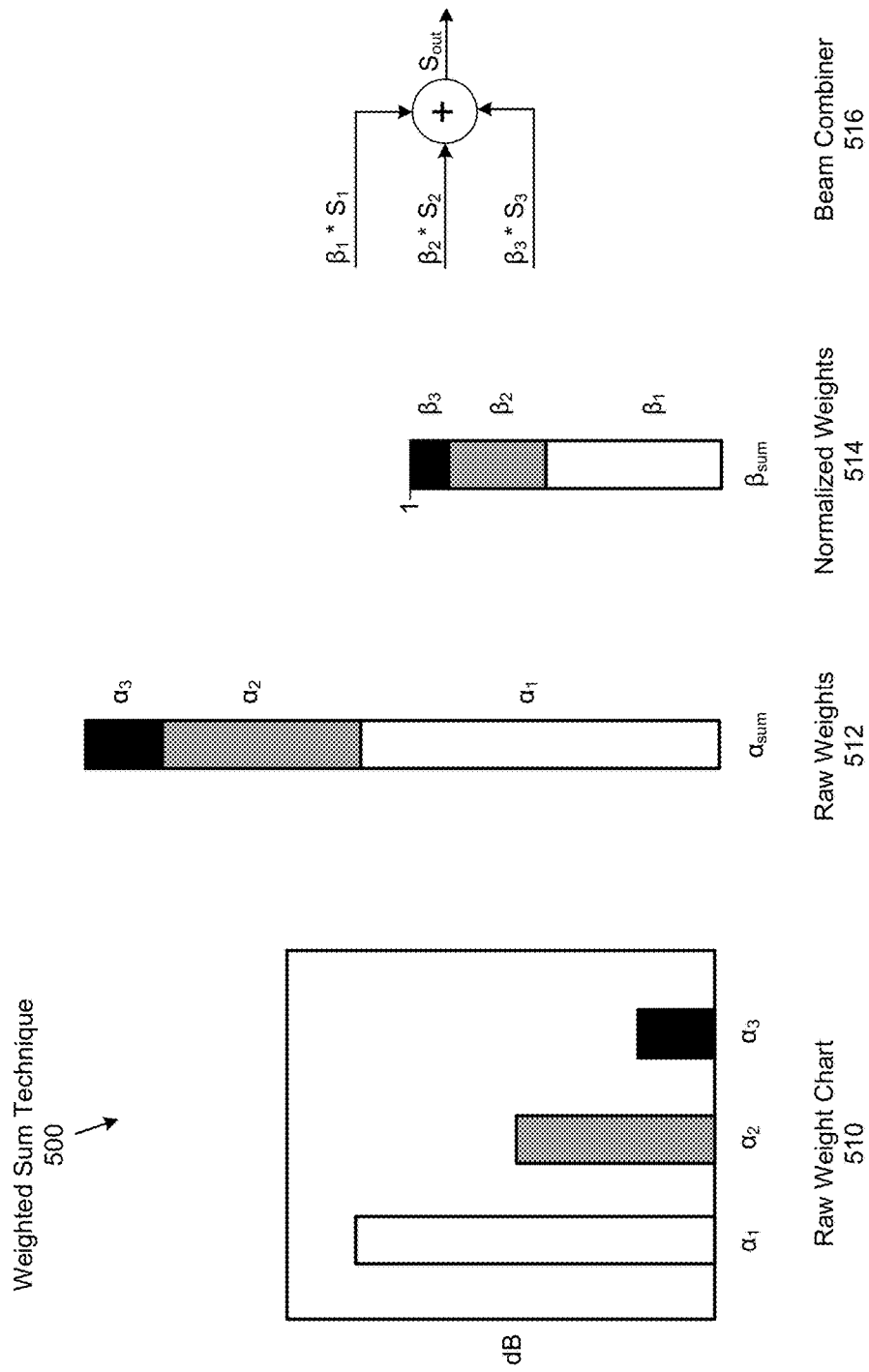

FIG. 6A
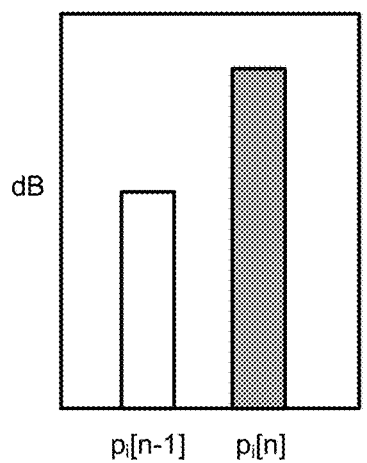
Power Chart
610
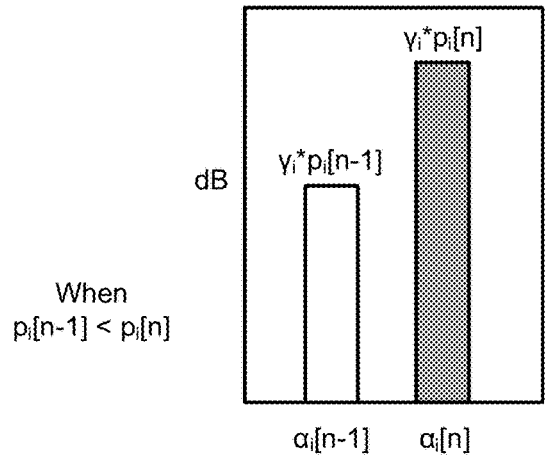
When
$p_i[n-1] < p_i[n]$
Raw Weight Chart
612
FIG. 6B
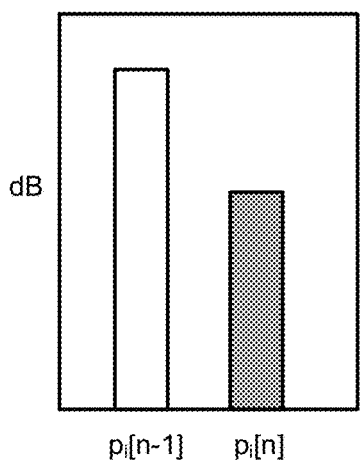
Power Chart
630
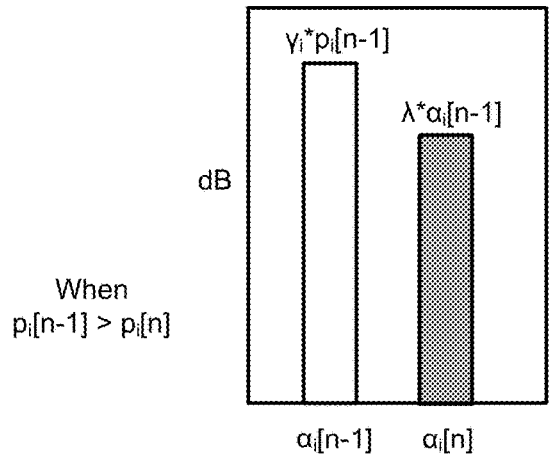
When
$p_i[n-1] > p_i[n]$
Raw Weight Chart
632

FIG. 9
2/4 Configuration
910
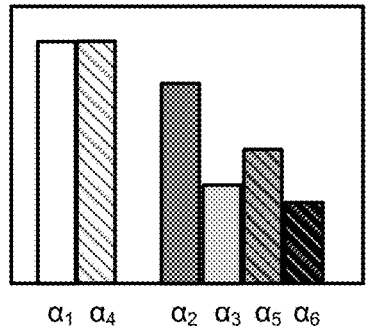
Group Chart
912
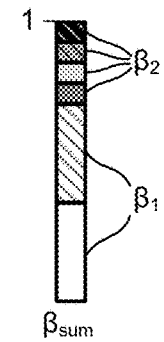
Weights
914
3/3 Configuration
920
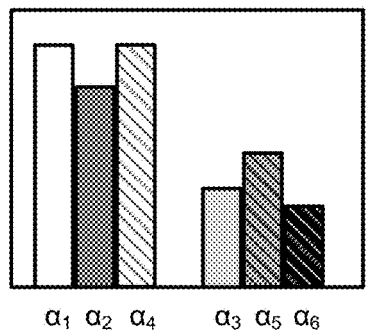
Group Chart
922
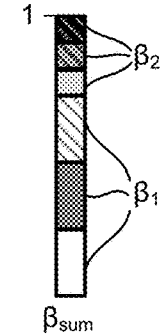
Weights
924
4/2 Configuration
930
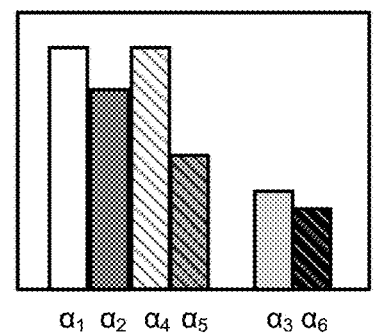
Group Chart
932
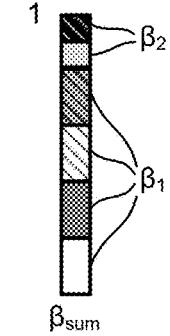
Weights
934

FIG. 11
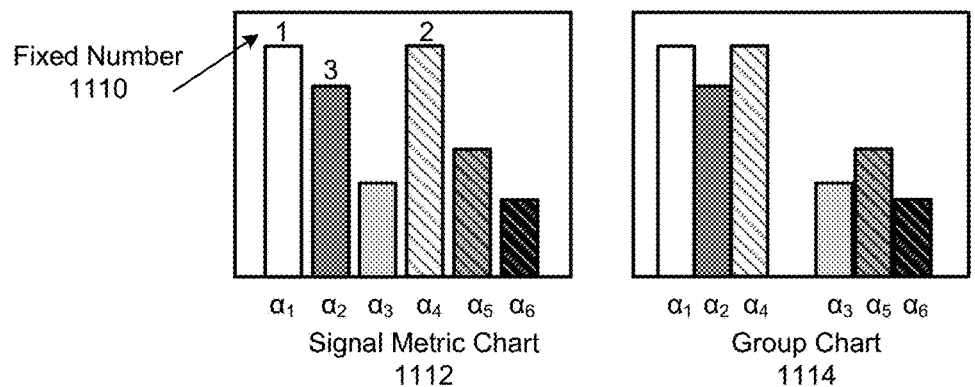
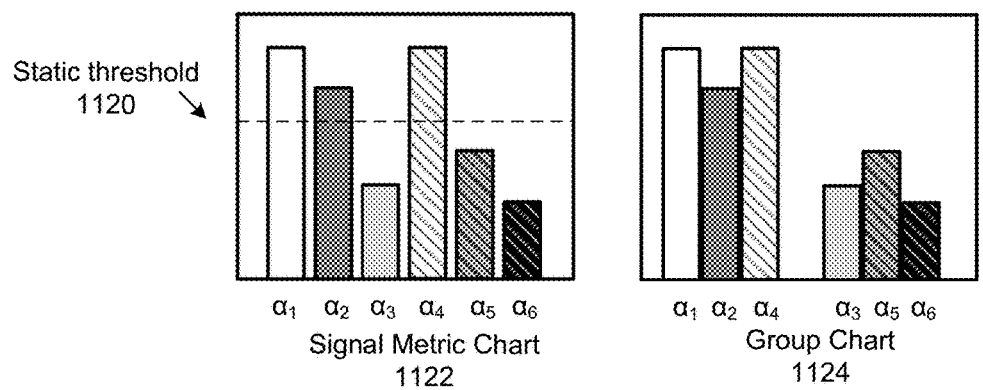
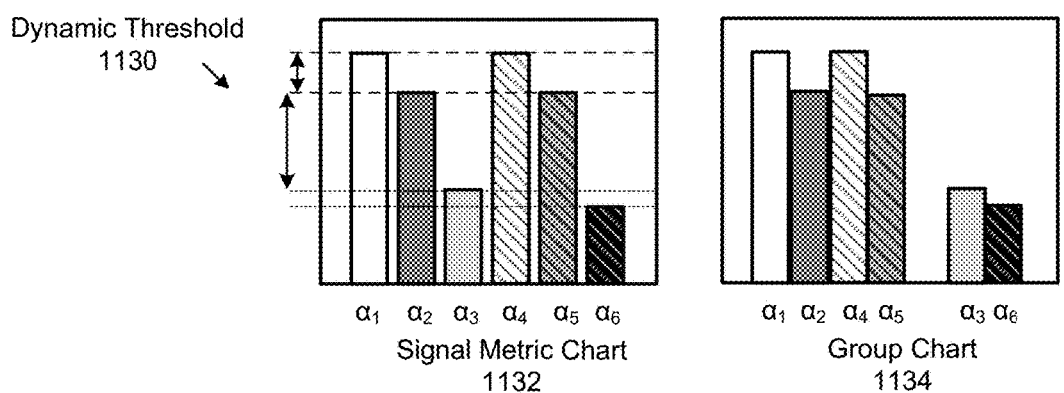

PARALLEL OUTPUT PATHS FOR ACOUSTIC ECHO CANCELLATION

BACKGROUND

In audio systems, acoustic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIG. 5 illustrates an example of generating a combined output using a weighted sum technique according to embodiments of the present disclosure.

FIGS. 6A-6B illustrate examples of controlling a rate of change of weights according to embodiments of the present disclosure.

FIG. 9 illustrates an example of different grouping configurations according to embodiments of the present disclosure.

FIG. 11 illustrates an example of different thresholds used in the equal weighting technique according to embodiments of the present disclosure.

DETAILED DESCRIPTION

Figure 1:
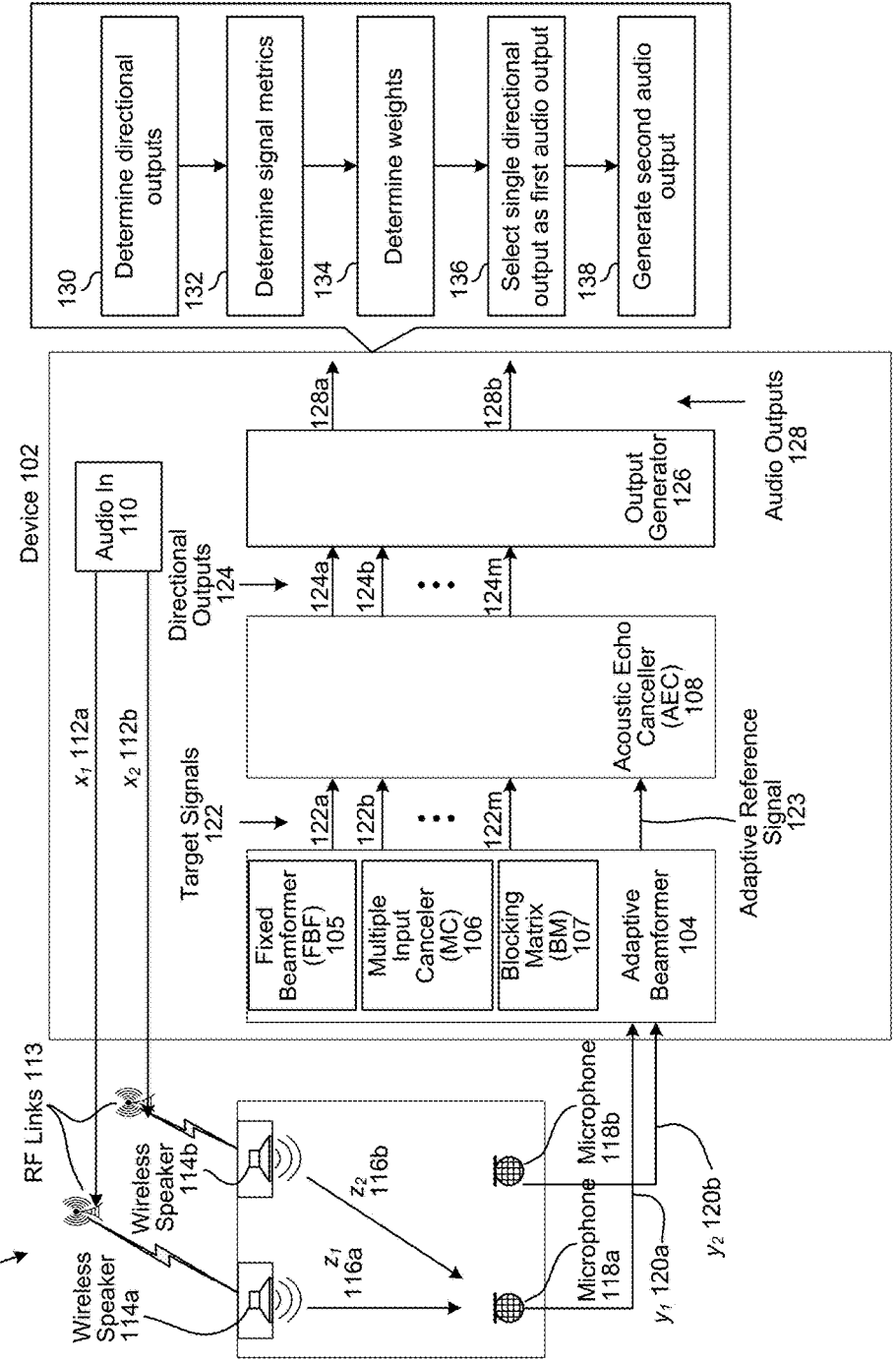
FIG. 1 illustrates an echo cancellation system according to embodiments of the present disclosure.

Typically, a conventional Acoustic Echo Cancellation (AEC) system may remove audio output by a loudspeaker from audio captured by the system's microphone(s) by subtracting a delayed version of the originally transmitted audio. However, in stereo and multi-channel audio systems that include wireless or network-connected loudspeakers and/or microphones, problem with the typical AEC approach may occur when there are differences between the signal sent to a loudspeaker and a signal received at the microphone. As the signal sent to the loudspeaker is not the same as the signal received at the microphone, the signal sent to the loudspeaker is not a true reference signal for the AEC system. For example, when the AEC system attempts to remove the audio output by the loudspeaker from audio captured by the system's microphone(s) by subtracting a delayed version of the originally transmitted audio, the audio captured by the microphone may be subtly different than the audio that had been sent to the loudspeaker.

To perform Acoustic Echo Cancellation (AEC) without knowing the signal played by the loudspeaker, an Adaptive Reference Signal Selection Algorithm (ARSSA) AEC system may perform audio beamforming on a signal received by the microphones and may determine a reference signal and a target signal based on the audio beamforming. For example, the ARSSA AEC system may receive audio input and separate the audio input into multiple directions. The ARSSA AEC system may detect a strong signal associated with a speaker and may set the strong signal as a reference signal, selecting another direction as a target signal. In some examples, the ARSSA AEC system may determine a speech position (e.g., near end talk position) and may set the direction associated with the speech position as a target signal and an opposite direction as a reference signal. If the ARSSA AEC system cannot detect a strong signal or determine a speech position, the system may create pairwise combinations of opposite directions, with an individual direction being used as a target signal and a reference signal. The ARSSA AEC system may remove the reference signal (e.g., audio output by the loudspeaker) to isolate speech included in the target signal.

To improve Automatic Speech Recognition (ASR), the AEC system may prioritize first speech from a single user and ignore second speech from additional users and/or environmental noise. Therefore, the AEC system may select audio associated with a single direction (e.g., speech position) as a target signal and remove reference signal(s) from the target signal to isolate the first speech. However, when there is speech from multiple users in multiple directions, isolating a single direction includes only a portion of the speech. In some situations, such as during a conference call, it is desirable to include all of the speech and/or environmental noise. Therefore, the AEC system may select audio associated with multiple directions as target signals, remove reference signal(s) from the target signals to isolate speech and/or environmental noise in individual directions and generate a combined output including portions from each of the individual directions. However, while the AEC system generates the combined output desirable for the conference call, ASR performance may be negatively impacted due to overlapping speech from multiple users.

To further improve echo cancellation, devices, systems and methods may combine the advantages of single direction AEC, which is desirable for ASR, and multi-direction AEC, which is desirable for conference calls. Thus, a device may be configured to provide two output paths to enable ASR processing in parallel with voice communication (e.g., Voice over Internet Protocol (VoIP)). For example, for single direction AEC (e.g., ASR processing), the device 102 may prioritize speech from a single user and ignore other speech and/or environmental noise by selecting a single directional output from a plurality of directional outputs. For multi-directional AEC (e.g., voice communication), the device may include all speech and environmental noise by combining the plurality of directional outputs. In some examples, the device may combine the plurality of directional outputs using a weighted sum technique, such that each directional output is represented in the combined output based on a corresponding signal metric (e.g., signal to noise ratio (SNR) or power) relative to the plurality of directional outputs. In other examples, the device may combine the plurality of directional outputs using an equal weighting technique, such that a first group of directional outputs having a higher signal metric may be equally weighted using a first weight while a second group of directional outputs having a lower signal metric may be equally weighted using a second weight.

FIG. 1 illustrates a high-level conceptual block diagram of echo-cancellation aspects of an AEC system 100. The system 100 is configured to provide two output paths to enable Automatic Speech Recognition (ASR) in parallel with Voice over Internet Protocol (VoIP) (e.g., voice communication). For example, the device 102 may generate a first audio output 128a for ASR processing and a second audio output 128b for VoIP communication. To illustrate, a local user of the device 102 may communicate with a remote user using a VoIP mode, with remote voice data being received by the device 102 and sent to wireless loudspeakers (e.g., wireless speakers 114) for playback. While the remote voice data is being played by the loudspeakers, the device 102 may capture local voice data (e.g., speech input from the local user, other users and environmental noise) using microphones 118. The device 102 may perform acoustic echo cancellation (AEC) in order to remove an echo signal (e.g., remote voice data) generated by the loudspeakers from the local voice data. As part of performing AEC, the device 102 may use a beamformer to separate the local voice data into separate portions corresponding to different directions, and the AEC may generate a plurality of outputs.

For ASR processing, the device 102 may prioritize speech from a single user and ignore other speech and/or environmental noise. Thus, the device 102 may generate the first audio output 128a by selecting a single output from the plurality of outputs. In contrast, for VoIP communication, the device 102 may include all speech and environmental noise. Thus, the device 102 may generate the second audio output 128b by combining the plurality of outputs. The device 102 may generate the second audio output 128b using a weighted sum technique or an equal weighting technique, as will be discussed in greater detail below.

As illustrated in FIG. 1, an audio input 110 provides stereo audio "reference" signals $x_1(n)$ 112a and $x_2(n)$ 112b (e.g., remote voice data). The reference signal $x_1(n)$ 112a is transmitted via a radio frequency (RF) link 113 to a wireless loudspeaker 114a, and the reference signal $x_2(n)$ 112b is transmitted via an RF link 113 to a wireless loudspeaker 114b. Each wireless speaker 114 outputs the received audio, and portions of the output sounds are captured by a pair of microphones 118a and 118b as "echo" signals $y_1(n)$ 120a and $y_2(n)$ 120b (e.g., local voice data), which contain some of the reproduced sounds from the reference signals $x_1(n)$ 112a and $x_2(n)$ 112b, in addition to any additional sounds (e.g., speech) picked up by the microphones 118.

The device 102 may include an adaptive beamformer 104 that may perform audio beamforming on the echo signals 120 to determine target signals 122 (e.g., 122a, 122b . . . 122m). For example, the adaptive beamformer 104 may include a fixed beamformer (FBF) 105, a multiple input canceler (MC) 106 and/or a blocking matrix (BM) 107. The FBF 105 may be configured to form a beam in a specific direction so that a target signal is passed and all other signals are attenuated, enabling the adaptive beamformer 104 to select a particular direction. In contrast, the BM 107 may be configured to form a null in a specific direction so that the target signal is attenuated and all other signals are passed. The adaptive beamformer 104 may generate fixed beamforms (e.g., outputs of the FBF 105) or may generate adaptive beamforms using a Linearly Constrained Minimum Variance (LCMV) beamformer, a Minimum Variance Distortionless Response (MVDR) beamformer or other beamforming techniques. For example, the adaptive beamformer 104 may receive audio input, determine six beamforming directions and output six fixed beamform outputs and six adaptive beamform outputs. In some examples, the adaptive beamformer 104 may generate six fixed beamform outputs, six LCMV beamform outputs and six MVDR beamform outputs, although the disclosure is not limited thereto.

In some examples, the adaptive beamformer 104 may generate the same number of outputs as inputs, such that there is an equal number of echo signals 120 and target signals 122. However, the disclosure is not limited thereto and the number of target signals 122 may vary and does not need to match the number of echo signals 120.

While FIG. 1 illustrates the device 102 including the adaptive beamformer 104, a traditional AEC system may perform AEC without the adaptive beamformer 104 without departing from the present disclosure. For example, the device 102 may perform beamforming using the FBF 105 or other techniques known to one of skill in the art.

Using the adaptive beamformer 104 and techniques discussed below, the device 102 may determine the target signals 122 to pass to an acoustic echo cancellation (AEC) 108. Additionally, the adaptive beamformer 104 may use an Adaptive Reference Signal Selection Algorithm (ARSSA) to generate an adaptive reference signal 123. However, the disclosure is not limited thereto and the device 102 may generate a reference signal using techniques known to one of skill in the art. For example, the device 102 may include playback reference logic (not shown) that may generate a playback reference signal instead of the adaptive reference signal 123. To generate the playback reference signal, the playback reference logic may receive the reference signals 112 (e.g., originally transmitted audio) and may compensate for distortion, variable delay, drift, skew and/or frequency offset. For example, the playback reference logic may determine a propagation delay between the reference signals 112 and the echo signals 120 and may modify the reference signals 112 to remove the propagation delay. Additionally or alternatively, the playback reference logic may determine a frequency offset between the modified reference signals 112 and the echo signals 120 and may add/drop samples of the modified reference signals and/or the echo signals 120 to compensate for the frequency offset. For example, the playback reference logic may add at least one sample per cycle when the frequency offset is positive and may remove at least one sample per cycle when the frequency offset is negative. Therefore, the playback reference signal may be aligned with the echo signals 120.

The device 102 may determine the target signals 122 and the adaptive reference signal 123 using multiple techniques. For example, the device 102 may use a first technique when the device 102 detects a clearly defined speaker signal, a second technique when the device 102 doesn't detect a clearly defined speaker signal but does identify a speech position and/or a third technique when the device 102 doesn't detect a clearly defined speaker signal or a speech position. Using the first technique, the device 102 may associate the clearly defined speaker signal with the adaptive reference signal 123 and may select any or all of the other directions as the target signal(s) 122. For example, the device 102 may generate a single target signal 122 using all of the remaining directions for a single loudspeaker or may generate multiple target signals 122 using portions of remaining directions for multiple loudspeakers. Using the second technique, the device 102 may associate the speech position with the target signal 122 and may select an opposite direction as the adaptive reference signal 123. Using the third technique, the device 102 may select multiple combinations of opposing directions to generate multiple target signals 122 and multiple adaptive reference signals 123.

In some examples, the device 102 may associate specific directions with the reproduced sounds and/or speech based on features of the signal sent to the loudspeaker. Examples of features includes power spectrum density, peak levels, pause intervals or the like that may be used to identify the signal sent to the loudspeaker and/or propagation delay between different signals. For example, the adaptive beamformer 104 may compare the signal sent to the loudspeaker with a signal associated with a first direction to determine if the signal associated with the first direction includes reproduced sounds from the loudspeaker. When the signal associated with the first direction matches the signal sent to the loudspeaker, the device 102 may associate the first direction with a wireless speaker 114 (e.g., use the first direction as the adaptive reference signal 123). When the signal associated with the first direction does not match the signal sent to the loudspeaker, the device 102 may associate the first direction with speech, a speech position, a person or the like. In some examples, the adaptive beamformer 104 may generate the target signals 122 using pairwise combinations of different directions.

The device 102 may optionally determine a speech position (e.g., near end talk position) associated with speech and/or a person speaking. For example, the device 102 may identify the speech, a person and/or a position associated with the speech/person using audio data (e.g., audio beamforming when speech is recognized), video data (e.g., facial recognition) and/or other inputs known to one of skill in the art. The device 102 may determine target signals 122, which may include a single target signal (e.g., echo signal 120 received from a microphone 118) or may include multiple target signals (e.g., target signal 122a, target signal 122b, . . . target signal 122n) that may be generated using the FBF 105 or other components of the adaptive beamformer 104. In some examples, the device 102 may determine the target signals based on the speech position. The device 102 may determine an adaptive reference signal based on the speech position and/or the audio beamforming. For example, the device 102 may associate the speech position with a target signal and may select an opposite direction as the adaptive reference signal.

The AEC 108 may remove the adaptive reference signal 123 (e.g., reproduced sounds) from the target signals 122 (e.g., reproduced sounds and additional sounds) to remove the reproduced sounds and isolate the additional sounds (e.g., speech) as directional outputs 124 (e.g., 124a, 124b . . . 124m).

To illustrate, in some examples the device 102 may use outputs of the FBF 105 as the target signals 122. For example, the outputs of the FBF 105 may be shown in equation 1:

Target Signal=$s+z$+noise  (1)

where s is speech (e.g., the additional sounds), z is an echo from the signal sent to the loudspeaker (e.g., the reproduced sounds) and noise is additional noise that is not associated with the speech or the echo. In order to attenuate the echo (z), the device 102 may use the adaptive reference signal 123, which may be shown in equation 2:

Reference Signal=$z$+noise  (2)

By removing the adaptive reference signal 123 from the target signals 122, the device 102 may remove the echo and generate the directional outputs 124 including only the speech and some noise.

The AEC 108 may generate a plurality of directional outputs 124 (e.g., 124a, 124b . . . 124m). For example, each of the plurality of directional outputs 124 may correspond to a separate target signal 122. Additionally or alternatively, each of the plurality of directional outputs 124 may correspond to a direction determined by the adaptive beamformer 104. While FIG. 1 illustrates the adaptive beamformer 104 performing beamforming prior to the AEC 108 performing acoustic echo cancellation, the disclosure is not limited thereto and the device 102 may perform beamforming after performing the acoustic echo cancellation. The order of the beamforming and echo cancellation is not important in the generation of the directional outputs 124.

The device 102 may include an output generator 126 that may receive the directional outputs and generate audio outputs 128. For example, the output generator 126 may generate a first audio output 128a (e.g., ASR output path) and a second audio output 128b (e.g., VoIP output path). As discussed above, to generate the first audio output 128a, the output generator 126 may prioritize speech from a single user and ignore other speech and/or environmental noise. Thus, the output generator 126 may determine a single directional output having a strongest signal of the directional outputs 124 and may select the single directional output as the first audio output 128a. In contrast, to generate the second audio output 128b, the output generator 126 include all speech and environmental noise. Thus, the output generator 126 may generate the second audio output 128b by combining the directional outputs 124.

As a first example, the output generator 126 may generate the second audio output 128b using a weighted sum technique. For example, the output generator 126 may determine a signal strength for each of the directional outputs 124 and may generate a weight corresponding to the signal strength. Thus, a first directional output 124a may have a first weight, a second directional output 124b may have a second weight, and so on until an mth directional output 124m has an mth weight. The output generator 126 may generate the second audio output 128b by multiplying the directional outputs 124 by corresponding weights (e.g., first directional output 124a multiplied by the first weight, second directional output 124b multiplied by the second weight, etc.) and summing the products.

As a second example, the output generator 126 may generate the second audio output 128b using an equal weighting technique. For example, the output generator 126 may determine a signal strength for each of the directional outputs 124 and may separate the directional outputs 124 into two separate groups. Thus, if there are six directional outputs 124, the output generator 126 may select three directional outputs having a highest signal strength (e.g., 124a, 124b, 124c) as a first group and select three directional outputs having a lowest signal strength (e.g., 124d, 124e, 124f) as a second group. After separating the six directional outputs into the two groups, the output generator 126 may assign a first weight (e.g., higher priority) to the first group and a second weight (e.g., lower priority) to the second group. For example, the first group may be assigned a first weight so that the sum of the first weights is equal to a first percentage (e.g., 70%), and the second group may be assigned a second weight so that the sum of the second weights is equal to a second percentage (e.g., 30%). In the example discussed above, the first weight would be approximately 0.233 (for a total sum of 0.7), whereas the second weight would be approximately 0.1 (for a total sum of 0.3). The output generator 126 may generate the second audio output 128b by multiplying the directional outputs 124 by the corresponding weights (e.g., directional output 124a-124c multiplied by the first weight, directional outputs 124d-124f multiplied by the second weight) and summing the products.

The audio outputs 128 may be processed by the device 102, sent to a remote device for further processing and/or sent to a remote device during voice communication. For example, the second audio output 128b may be sent to a remote device as part of VoIP communication. Additionally or alternatively, the device 102 (or a remote device, such as a server) may perform speech recognition processing on the first audio output 128a to determine a command and may execute the command. For example, the device 102 may determine that the speech corresponds to a command to play music and the device 102 may play music in response to receiving the speech. The device 102 may perform additional actions based on other commands, such as changing a volume of audio output by the device 102 and/or wireless speakers 114, launching an application, ending the VoIP communication or the like. In some examples, the device 102 may send the first audio output 128a to a server, the server may perform speech processing on the first audio output 128a to determine the command and may send the command to the device 102 and the device 102 may execute the command.

As illustrated in FIG. 1, the device 102 may determine (130) directional outputs. For example, the device 102 may receive audio input from the microphones 118, may perform audio beamforming to separate the audio input into separate directions, may determine target signal(s) 122 and reference signal(s) 123, remove an echo from the target signal(s) 122 by removing the reference signal(s) 123 to isolate speech or additional sounds, and may generate the directional outputs 124.

The device 102 may determine (132) signal metrics, such as signal to noise ratios (SNRs) associated with the directional outputs 124. For example, the device 102 may determine a first SNR associated with the first directional output 124a, a second SNR associated with a second directional output 124b, etc. However, SNR is just a single example of a parameter or characteristic associated with the directional outputs 124 and the present disclosure is not limited thereto. Instead of using SNRs, the device 102 may compare the directional outputs 124 using other characteristics or parameters (e.g., signal strength, power, etc.).

The device 102 may determine (134) weights associated with the directional outputs 124 based on the signal metrics. For example, the device 102 may use the first SNR to determine a first weight corresponding to the first directional output 124a, use the second SNR to determine a second weight corresponding to the second directional output 124b, and so on. As discussed above, the signal metrics are not limited to SNRs and the device 102 may determine the weights using any signal metrics known to one of skill in the art. For example, the device 102 may determine the first weight using a first magnitude of power associated with the first directional output 124a without departing from the disclosure.

As discussed above, the device 102 may determine the weights using multiple techniques, including a weighted sum technique and/or an equal weighting technique. To illustrate the weighted sum technique, a first directional output 124a may have a first weight, a second directional output 124b may have a second weight, and so on until an mth directional output 124m has an mth weight. To illustrate the equal weighting technique, a first group of directional outputs 124 (e.g., 124a, 124b and 124c) may have a first weight (e.g., 0.233) and a second group of directional outputs 124 (e.g., 124d, 124e and 124f) may have a second weight (e.g., 0.1).

The device 102 may select (136) a single directional output as a first audio output 128a. For example, the device 102 may determine a first directional output 124a having a highest SNR and may select the first directional output 124a as the first audio output 128a.

The device 102 may generate (138) a second audio output 128b using the directional outputs and the weights. Using the weighted sum example, the device 102 may generate the second audio output 128b by multiplying the directional outputs 124 by corresponding weights (e.g., first directional output 124a multiplied by the first weight, second directional output 124b multiplied by the second weight, etc.) and summing the products. Using the equal weighting example, the device 102 may generate the second audio output 128b by multiplying the directional outputs 124 by corresponding weights (e.g., directional output 124a-124c multiplied by the first weight, directional outputs 124d-124f multiplied by the second weight) and summing the products.

The device 102 may include a microphone array having multiple microphones 118 that are laterally spaced from each other so that they can be used by audio beamforming components to produce directional audio signals. The microphones 118 may, in some instances, be dispersed around a perimeter of the device 102 in order to apply beampatterns to audio signals based on sound captured by the microphone(s) 118. For example, the microphones 118 may be positioned at spaced intervals along a perimeter of the device 102, although the present disclosure is not limited thereto. In some examples, the microphone(s) 118 may be spaced on a substantially vertical surface of the device 102 and/or a top surface of the device 102. Each of the microphones 118 is omnidirectional, and beamforming technology is used to produce directional audio signals based on signals from the microphones 118. In other embodiments, the microphones may have directional audio reception, which may remove the need for subsequent beamforming.

In various embodiments, the microphone array may include greater or less than the number of microphones 118 shown. Speaker(s) (not illustrated) may be located at the bottom of the device 102, and may be configured to emit sound omnidirectionally, in a 360 degree pattern around the device 102. For example, the speaker(s) may comprise a round speaker element directed downwardly in the lower part of the device 102.

Using the plurality of microphones 118 the device 102 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 102 may include an adaptive beamformer 104 that may include one or more audio beamformers or beamforming components that are configured to generate an audio signal that is focused in a direction from which user speech has been detected. More specifically, the beamforming components may be responsive to spatially separated microphone elements of the microphone array to produce directional audio signals that emphasize sounds originating from different directions relative to the device 102, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 2:
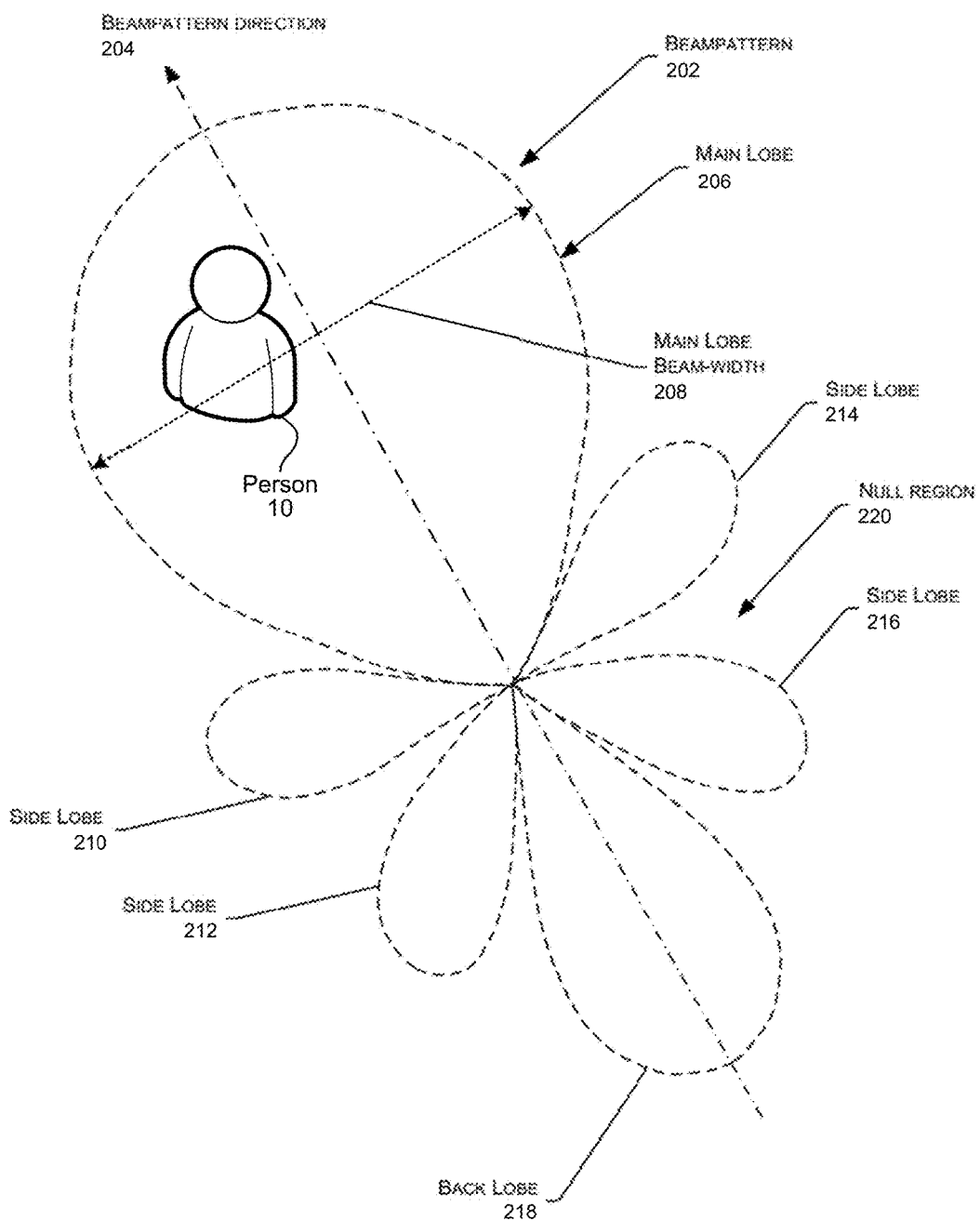
FIG. 2 is an illustration of beamforming according to embodiments of the present disclosure.

FIG. 2 is an illustration of beamforming according to embodiments of the present disclosure. FIG. 2 illustrates a schematic of a beampattern 202 formed by applying beamforming coefficients to signal data acquired from a microphone array of the device 102. As mentioned above, the beampattern 202 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 202 may exhibit a plurality of lobes, or regions of gain, with gain predominating in a particular direction designated the beampattern direction 204. A main lobe 206 is shown here extending along the beampattern direction 204. A main lobe beam-width 208 is shown, indicating a maximum width of the main lobe 206. In this example, the beampattern 202 also includes side lobes 210, 212, 214, and 216. Opposite the main lobe 206 along the beampattern direction 204 is the back lobe 218. Disposed around the beampattern 202 are null regions 220. These null regions are areas of attenuation to signals. In the example, the person 10 resides within the main lobe 206 and benefits from the gain provided by the beampattern 202 and exhibits an improved SNR ratio compared to a signal acquired with non-beamforming. In contrast, if the person 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 102 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 102 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the device 102 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

Figure 3B:
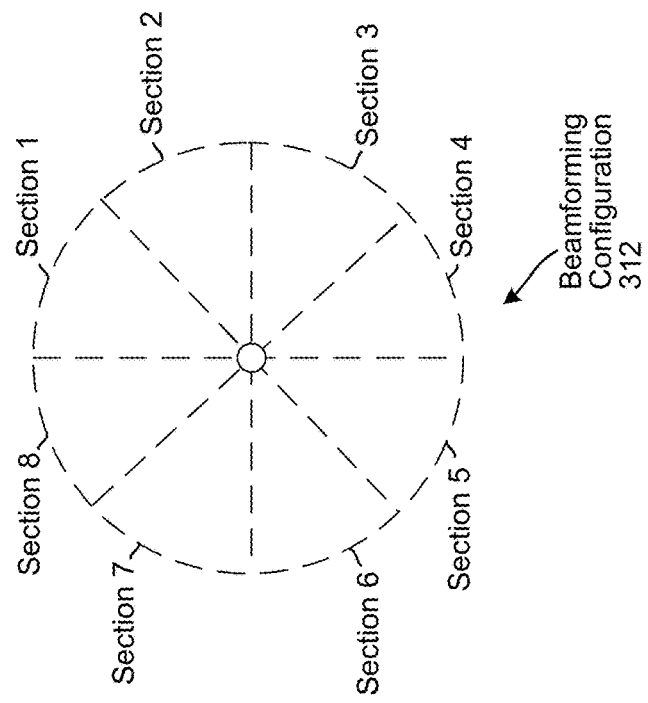
FIGS. 3A-3B illustrate examples of beamforming configurations according to embodiments of the present disclosure.
Figure 3A:
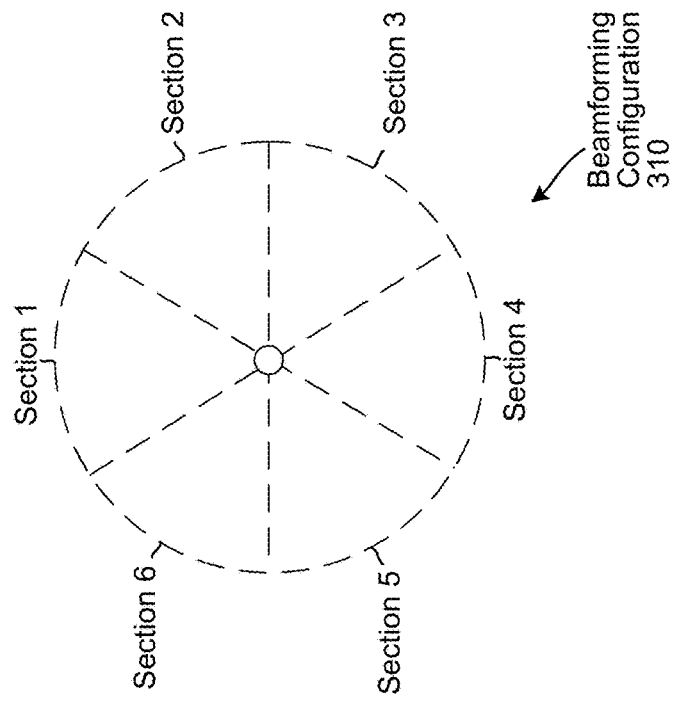

FIGS. 3A-3B illustrate examples of beamforming configurations according to embodiments of the present disclosure. As illustrated in FIG. 3A, the device 102 may perform beamforming to determine a plurality of portions or sections of audio received from a microphone array. FIG. 3A illustrates a beamforming configuration 310 including six portions or sections (e.g., Sections 1-6). For example, the device 102 may include six different microphones, may divide an area around the device 102 into six sections or the like. However, the present disclosure is not limited thereto and the number of microphones in the microphone array and/or the number of portions/sections in the beamforming may vary.

As illustrated in FIG. 3B, the device 102 may generate a beamforming configuration 312 including eight portions/sections (e.g., Sections 1-8) without departing from the disclosure. For example, the device 102 may include eight different microphones, may divide the area around the device 102 into eight portions/sections or the like. Thus, the following examples may perform beamforming and separate an audio signal into eight different portions/sections, but these examples are intended as illustrative examples and the disclosure is not limited thereto.

The number of portions/sections generated using beamforming does not depend on the number of microphones in the microphone array. For example, the device 102 may include twelve microphones in the microphone array but may determine three portions, six portions or twelve portions of the audio data without departing from the disclosure. While the examples illustrated in FIGS. 3A and 3B show the device 102 determining portions/sections in all directions (e.g, 360 degrees around the device 102), this is intended for illustrative purpose only and the disclosure is not limited thereto. Instead, the device 102 may determine portions/sections in only some directions (e.g., 180 degrees around the device 102, for example if the device 102 is mounted to a vertical surface like a wall). Additionally or alternatively, the device 102 may determine discrete portions/sections with gaps between them (e.g., 60 degrees in a first direction and 60 degrees in a second direction opposite the first direction) without departing from the disclosure.

As discussed above, the adaptive beamformer 104 may generate fixed beamforms (e.g., outputs of the FBF 105) or may generate adaptive beamforms using a Linearly Constrained Minimum Variance (LCMV) beamformer, a Minimum Variance Distortionless Response (MVDR) beamformer or other beamforming techniques. For example, the adaptive beamformer 104 may receive the audio input, may determine six beamforming directions and output six fixed beamform outputs and six adaptive beamform outputs corresponding to the six beamforming directions. In some examples, the adaptive beamformer 104 may generate six fixed beamform outputs, six LCMV beamform outputs and six MVDR beamform outputs, although the disclosure is not limited thereto.

The device 102 may determine a number of wireless loudspeakers and/or directions associated with the wireless loudspeakers using the fixed beamform outputs. For example, the device 102 may localize energy in the frequency domain and clearly identify much higher energy in two directions associated with two wireless loudspeakers (e.g., a first direction associated with a first speaker and a second direction associated with a second speaker). In some examples, the device 102 may determine an existence and/or location associated with the wireless loudspeakers using a frequency range (e.g., 1 kHz to 3 kHz), although the disclosure is not limited thereto. In some examples, the device 102 may determine an existence and location of the wireless speaker(s) using the fixed beamform outputs, may select a portion of the fixed beamform outputs as the target signal(s) and may select a portion of adaptive beamform outputs corresponding to the wireless speaker(s) as the reference signal(s).

To perform echo cancellation, the device 102 may determine a target signal and a reference signal and may remove the reference signal from the target signal to generate a directional output 124. For example, the loudspeaker may output audible sound associated with a first direction and a person may generate speech associated with a second direction. To remove the audible sound output from the loudspeaker, the device 102 may select a first portion of audio data corresponding to the first direction as the reference signal and may select a second portion of the audio data corresponding to the second direction as the target signal. However, the disclosure is not limited to a single portion being associated with the reference signal and/or target signal and the device 102 may select multiple portions of the audio data corresponding to multiple directions as the reference signal/target signal without departing from the disclosure. For example, the device 102 may select a first portion and a second portion as the reference signal and may select a third portion and a fourth portion as the target signal.

Additionally or alternatively, the device 102 may determine more than one reference signal and/or target signal. For example, the device 102 may identify a first wireless speaker and a second wireless speaker and may determine a first reference signal associated with the first wireless speaker and determine a second reference signal associated with the second wireless speaker. The device 102 may generate a first directional output 124 by removing the first reference signal from the target signal and may generate a second directional output 124 by removing the second reference signal from the target signal. Similarly, the device 102 may select a first portion of the audio data as a first target signal and may select a second portion of the audio data as a second target signal. The device 102 may therefore generate a first directional output 124 by removing the reference signal from the first target signal and may generate a second directional output 124 by removing the reference signal from the second target signal.

The device 102 may determine reference signals, target signals and/or directional output signals using any combination of portions of the audio data without departing from the disclosure. For example, the device 102 may select first and second portions of the audio data as a first reference signal, may select a third portion of the audio data as a second reference signal and may select remaining portions of the audio data as a target signal. In some examples, the device 102 may include the first portion in a first reference signal and a second reference signal or may include the second portion in a first target signal and a second target signal. If the device 102 selects multiple target signals and/or reference signals, the device 102 may remove each reference signal from each of the target signals individually (e.g., remove reference signal 1 from target signal 1, remove reference signal 1 from target signal 2, remove reference signal 2 from target signal 1, etc.), may collectively remove the reference signals from each individual target signal (e.g., remove reference signals 1-2 from target signal 1, remove reference signals 1-2 from target signal 2, etc.), remove individual reference signals from the target signals collectively (e.g., remove reference signal 1 from target signals 1-2, remove reference signal 2 from target signals 1-2, etc.) or any combination thereof without departing from the disclosure.

The device 102 may select fixed beamform outputs or adaptive beamform outputs as the target signal(s) and/or the reference signal(s) without departing from the disclosure. In a first example, the device 102 may select a first fixed beamform output (e.g., first portion of the audio data determined using fixed beamforming techniques) as a reference signal and a second fixed beamform output as a target signal. In a second example, the device 102 may select a first adaptive beamform output (e.g., first portion of the audio data determined using adaptive beamforming techniques) as a reference signal and a second adaptive beamform output as a target signal. In a third example, the device 102 may select the first fixed beamform output as the reference signal and the second adaptive beamform output as the target signal. In a fourth example, the device 102 may select the first adaptive beamform output as the reference signal and the second fixed beamform output as the target signal. However, the disclosure is not limited thereto and further combinations thereof may be selected without departing from the disclosure.

The device 102 may generate directional outputs 124 using the selected target signal(s) and reference signal(s). In some examples, the device 102 may generate a directional output 124 corresponding to each of the sections in a beamforming configuration. For example, the beamforming configuration 310 illustrated in FIG. 3A would result in six directional outputs 124, whereas the beamforming configuration 312 illustrated in FIG. 3B would result in eight directional outputs. However, the disclosure is not limited thereto and the number of directional outputs may vary. For example, if a power level associated with a section is below a threshold, the device 102 may not generate a directional output 124 corresponding to the section. Additionally or alternatively, the device 102 may generate multiple directional outputs 124 corresponding to a single direction (e.g., section). Thus, the device 102 may use different combinations of target signal(s) and/or reference signal(s). For example, the device 102 may generate a first directional output with Section 1 as a target signal and Section 4 as a reference signal and may generate a second directional output with Section 1 as a target signal and Sections 2-6 as a reference signal.

The device 102 may determine the directional outputs 124 using different techniques. For example, the device 102 may use a first technique when the device 102 detects a clearly defined speaker signal (e.g., wireless speaker 114), a second technique when the device 102 doesn't detect a clearly defined speaker signal but does identify a speech position (e.g., near end talk position) associated with a person, and/or a third technique when the device 102 doesn't detect a clearly defined speaker signal or a speech position.

To illustrate the first technique, the device 102 may detect a clearly defined speaker signal. For example, the device 102 may detect a wireless speaker 114 in Section 1 of the beamforming configuration 310 and the device 102 may associate the wireless speaker 114 with Section 1. To generate directional outputs 124, the device 102 may set Section 1 as a reference signal and may identify one or more remaining sections as target signal(s). For example, the device 102 may generate a plurality of directional outputs 124, with each directional output 124 corresponding to a single section (e.g., Section 2, Section 3, etc.) using Section 1 as the reference signal. Additionally or alternatively, the device 102 may generate one or more directional outputs 124 using a combination of sections as the target signals. If the device 102 detects an additional wireless speaker 114 in Section 6, the device 102 may generate directional outputs 124 using any combination of the remaining sections (e.g., Sections 2-5) as target signals and Section 1, Section 6 or a combination thereof as reference signal(s). For example, the device 102 may generate first directional outputs 124 using Section 1 as a reference signal, second directional outputs 124 using Section 6 as a reference signal and/or third directional outputs 124 using Sections 1 and 6 as reference signals.

To illustrate the second technique, the device 102 may not detect a clearly defined speaker signal but may identify a speech position (e.g., near end talk position) associated with a person. For example, the device 102 may identify the person and/or a position associated with the person using audio data (e.g., audio beamforming), video data (e.g., facial recognition) and/or other inputs known to one of skill in the art. In some examples, the device 102 may determine that speech is associated with a section and may determine a speech position using the section. In other examples, the device 102 may receive video data associated with the audio data and may use facial recognition or other techniques to determine a position associated with a face recognized in the video data. If the device 102 detects the person in Section 2, the device 102 may associate Section 2 with the person and use Section 2 as a target signal with one or more sections as reference signal(s). For example, the device 102 may generate directional outputs 124 using Section 2 as the target signal, with each directional output 124 corresponding to a single section (e.g., Section 1, Section 3, Section 4, etc.) as a reference signal. Additionally or alternatively, the device 102 may generate one or more directional outputs 124 using a combination of sections as the reference signals. If the device 102 identifies an additional speech position (e.g., second person) in Section 3, the device 102 may generate directional outputs 124 using any combination of the remaining sections (e.g., Section 1, Sections 4-6) as reference signals and Section 2, Section 3 or a combination thereof as target signal(s). For example, the device 102 may generate first directional outputs 124 using Section 2 as a target signal, second directional outputs 124 using Section 3 as a target signal and/or third directional outputs 124 using Sections 2 and 3 as target signals.

To illustrate the third technique, the device 102 may not detect a clearly defined speaker signal or identify a speech position (e.g., near end talk position) associated with a person. For example, audio from a wireless speaker 114 may reflect off of multiple objects such that the device 102 receives the audio from multiple locations at a time and is therefore unable to locate a specific section to associate with the wireless speaker. In this situation, the device 102 may generate directional outputs 124 using pairwise combinations of the sections illustrated in FIGS. 3A-3B. For example, using the beamforming configuration 310 illustrated in FIG. 3A, the device 102 may use Section 1 as a target signal and Section 4 as a reference signal in a first directional output and use Section 1 as a reference signal and Section 4 as a target signal in a fifth directional output. Similarly, the device 102 may use Section 2 as a target signal and Section 5 as a reference signal in a second directional output and Section 2 as a reference signal and Section 5 as a target signal in a fifth directional output. Thus, the device 102 may combine each of the different sections such that there are the same number of directional outputs as sections.

Figure 4A:
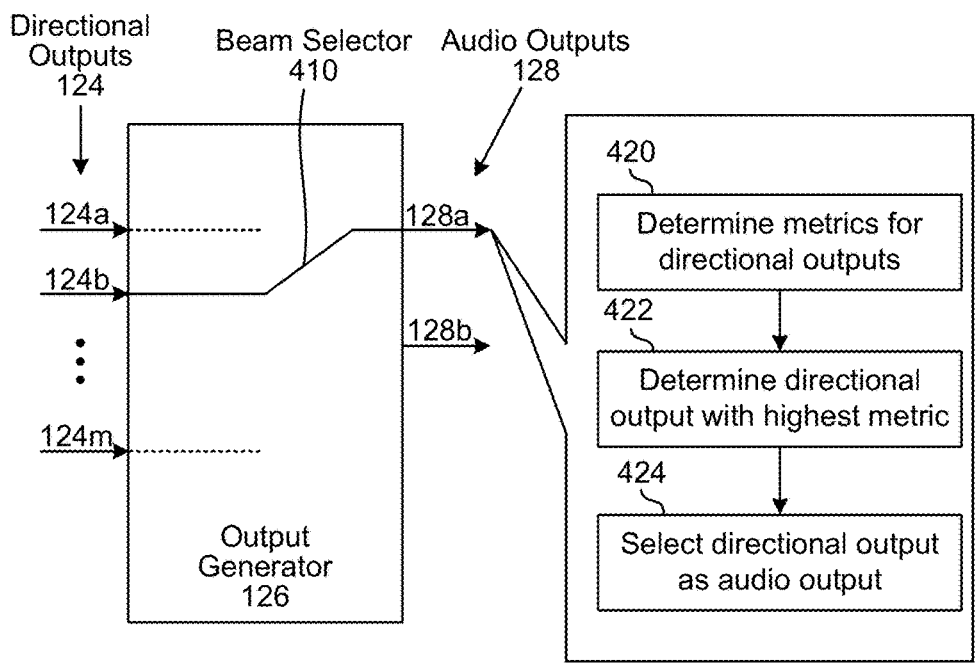
FIGS. 4A-4B illustrate examples of generating audio outputs according to embodiments of the present disclosure.
Figure 4B:
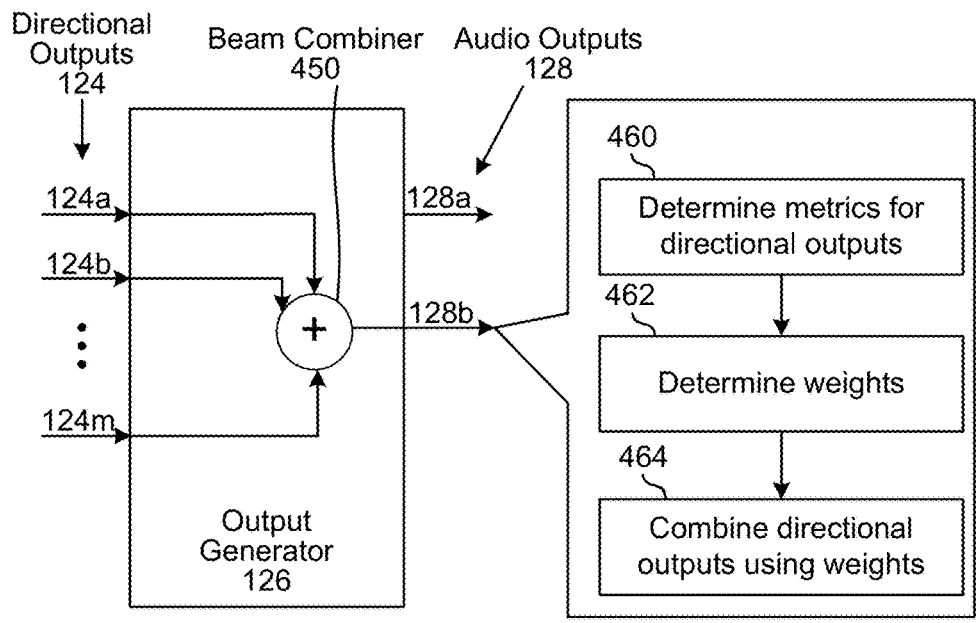

FIGS. 4A-4B illustrate examples of generating audio outputs according to embodiments of the present disclosure. Referring back to FIG. 1, the output generator 126 may receive a plurality of directional outputs 124 and may generate a first audio output 128a and a second audio output 128b. FIG. 4A illustrates an example of generating the first audio output 128a, which may prioritize a single speech position and corresponding audio data on which to perform ASR processing, whereas FIG. 4B illustrates an example of generating the second audio output 128, which may combine multiple speech positions and/or environmental noise and send corresponding audio data as part of VoIP communication. Thus, the device 102 may enable two separate output paths, with the first output path (e.g., first audio output 128a) enabling the device 102 to receive commands from a single person while the second output path (e.g., second audio output 128b) enables the device 102 to send audio data corresponding to multiple people.

After generating the first audio output 128a, the device 102 may perform Automatic Speech Recognition (ASR) on the first audio output 128a, may determine a command using the ASR output and may execute the command. For example, the device 102 may determine that speech included in the first audio output 128a corresponds to a command to play music and the device 102 may play music in response to receiving the speech. Additionally or alternatively, the device 102 may send the first audio output 128a to a remote device (e.g., server) to perform ASR and may receive the command from the remote device.

To illustrate an example, the device 102 may receive remote voice data corresponding to a remote person from a remote device (e.g., during VoIP communication) and may generate audio using the remote voice data, either using an internal loudspeaker or a wireless speaker 114. While the device 102 is generating the audio, the device 102 may capture local voice data corresponding to local people using a microphone 118. The device 102 may perform AEC on the local voice data to remove reproduced sounds corresponding to the remote voice data that are captured by the microphone 118 and may generate the first audio output 128a and the second audio output 128b. Using the first audio output 128a, the device 102 may determine and execute a command, enabling a local person to control the device 102 using voice commands (e.g., speech commands or the like). The device 102 may send the second audio output 128b to the remote device for playback.

As illustrated in FIG. 4A, the output generator 126 may receive directional outputs 124 (e.g., 124a, 124b . . . 124m) and may select a single directional output (e.g., 124b) as the first audio output 128a using a beam selector 410. For example, the output generator 126 may determine (420) signal metrics for directional outputs, may determine (422) a directional output with the highest signal metric and may select (424) the directional output as the audio output. For example, the output generator 126 may determine signal metrics such as signal to noise ratios (SNRs) associated with each of the directional outputs. The device 102 may determine that a single directional output (e.g., 124b) has a highest SNR of the directional outputs 124b and may select the directional output 124b as the first audio output 128a. However, SNR is just a single example of a parameter or characteristic associated with the audio outputs and the present disclosure is not limited thereto. Instead of using SNRs, the device 102 may compare the directional outputs using other characteristics or parameters, such as a magnitude of power, and may select the audio output having the best results based on the desired characteristics/parameters.

As the first audio output 128a is used to perform ASR to determine a voice command, the ASR processing is improved if the output generator 126 selects a single directional output for an entirety of the voice command. For example, a first person may input a first voice command by speaking for ten seconds. If a second person interrupts and inputs a second voice command after five seconds, the output generator 126 may prematurely switch from the first voice command to the second voice command, resulting in an incomplete and/or incomprehensible voice command. For example, the output generator 126 may select a first directional output 124a (corresponding to the first voice command) for the first five seconds (e.g., 0-5 seconds) and a second directional output 124b (corresponding to the second voice command) for the second five seconds (e.g., 6-10 seconds), such that the first audio output 128a includes portions of the first voice command and the second voice command.

To improve the first audio output 128a, the output generator 126 may perform a variety of techniques to include an entirety of a voice command. As a first example, the output generator 126 may select a fixed speech position from which to input voice commands to the device 102. For example, the device 102 may determine that the first person is in charge of the device 102, determine a speech position of the first person, determine a directional output 124 corresponding to the speech position and select the directional output 124 as the first audio output 128a. Thus, the device 102 may associate the first person with the first directional output 124a and select the first directional output 124a as the first audio output 128a regardless of the signal metrics for the other directional outputs 124 (e.g., ignore the second directional output 124b when the second person is inputting the second voice command). As a second example, the output generator 126 may select varying speech positions based on a single person in charge of the device 102. For example, the device 102 may determine that the first person is in charge of the device 102, determine a current speech position of the first person, determine a directional output 124 corresponding to the current speech position and select the directional output 124 as the first audio output 128a. Thus, as the first person moves relative to the device 102, the device 102 may select a corresponding directional input 124 as the first audio output 128a. The device 102 may determine the current speech position using voice activity detection, voice recognition, facial recognition (if the device 102 has access to image data), or the like.

As a third example, the output generator 126 may maintain a directional input 124 for at least a fixed period of time. For example, the output generator 126 may determine that an SNR value of the second directional input 124b exceeds an SNR value of the first directional input 124a but may continue to output the first directional input 124a for the fixed period of time (e.g., 2 seconds, although the disclosure is not limited thereto and the fixed period of time may vary). As a fourth example, the output generator 126 may maintain a directional input 124 until the output generator 126 receives an indication that the voice command is complete. For example, the device 102 (or a remote device) may determine an endpoint (e.g., end of the first voice command) associated with the first directional input 124a using techniques known to one of skill in the art and the output generator 126 may maintain the first directional input 124a until the endpoint, at which point the output generator 126 may select the second directional input 124b as the first audio output 128a. Additionally or alternatively, the device 102 (or a remote device) may determine that the first directional output 124a corresponds to a complete command (e.g., a confidence level of a voice command generated by the ASR processing is above a threshold) and may maintain the first directional input 124a until the command is completed, at which point the output generator 126 may select the second directional input 124b as the first audio output 128a.

As illustrated in FIG. 4B, the output generator 126 may receive directional outputs 124 (e.g., 124a, 124b . . . 124m) and may combine multiple directional outputs to generate the second audio output 128b using a beam combiner 450. For example, the output generator 126 may determine (460) signal metrics for directional outputs 124, may determine (462) weights associated with each of the signal metrics and may combine (464) the directional outputs 124 using the weights to generate the second audio output 128b. The output generator 126 may combine the directional outputs 124 using multiple techniques, including a weighted sum technique discussed in further detail below with regard to FIGS. 5-7 and/or an equal weighting technique discussed in further detail below with regard to FIGS. 8-12.

In the weighted sum technique, the device 102 may determine a combined output $S_{out}$, normalized weights $\beta_i$, first sum $\alpha_{sum}$, and raw weights $\alpha_i$ with the following equations:

$$S_{out}=\beta_1*S_1+\beta_2*S_2+\ldots+\beta_m*S_m \quad [3]$$

$$\beta_i=\alpha_i/\alpha_{sum} \quad [4]$$

$$\alpha_{sum}=\alpha_1+\alpha_2+\ldots+\alpha_m \quad [5]$$

$$\alpha_i=\gamma_i*SNR_i \quad [6.1]$$

(or)

$$\alpha_i=\gamma_i*Power\_Beam_i \quad [6.2]$$

$$\gamma_i=1/(1+exp(-SNR_i/THR)) \quad [7]$$

where i is a natural number corresponding to the number of directional outputs 124 (e.g., i=1, 2, m), $SNR_i$ is a magnitude of a signal to noise ratio (SNR) for the ith directional output, $Power\_Beam_i$ is a magnitude of power for the ith directional output, THR is a threshold value (e.g., 15 dB), $\gamma_i$ is a scale factor, and a second sum $\beta_{sum}$ of the normalized weights $\beta_i$ is equal to a value of one:

$$\beta_{sum}=\beta_1+\beta_2+\ldots+\beta_m=1 \quad [8]$$

In some examples, the device 102 may set r=1 to simplify a processing of the combined output $S_{out}$. Additionally or alternatively, the device 102 may use double talk detection (DTD) and/or voice activity detection (VAD) to prevent the device 102 from changing AEC coefficients. For example, the device 102 may use DTD and/or VAD to detect near end talk, and when near end talk is detected, the device 102 may freeze AEC coefficients. Thus, the device 102 may not update the AEC coefficients when a far end talker is silent, or if both a far end talker and a near end talker are active.

FIG. 5 illustrates an example of generating a combined output using a weighted sum technique 500 according to embodiments of the present disclosure. FIG. 5 illustrates three directional outputs 124 (e.g., 124a, 124b and 124c, which are represented as $S_1$ $S_2$, and $S_3$) being combined into a single audio output 128b. As illustrated in FIG. 5, the device 102 may determine a first raw weight $\alpha_1$ corresponding to a first directional output 124a (e.g., $S_1$), determine a first normalized weight $\beta_1$ from the first raw weight $\alpha_1$, and multiply the first directional output 124a (e.g., $S_1$) by the first normalized weight $\beta_1$ to generate a first product. Similarly, the device 102 may determine a second raw weight $\alpha_2$ corresponding to a second directional output 124b (e.g., $S_2$), determine a second normalized weight $\beta_2$ from the second raw weight $\alpha_2$, and multiply the second directional output 124b (e.g., $S_2$) by the second normalized weight $\beta_2$ to generate a second product. Finally, the device 102 may determine a third raw weight $\alpha_3$ corresponding to a third directional output 124c (e.g., $S_3$), determine a third normalized weight $\beta_3$ from the third raw weight $\alpha_3$, and multiply the third directional output 124c (e.g., $S_3$) by the third normalized weight $\beta_3$ to generate a third product. The device 102 may determine the combined output (e.g., $S_{out}$) by summing the first product, the second product and the third product.

For example, raw weight chart 510 illustrates that a magnitude of the first raw weight $\alpha_1$ is much larger than a magnitude of the second raw weight $\alpha_2$, and the magnitude of the second raw weight $\alpha_2$ is much larger than a magnitude of the third raw weight $\alpha_3$. Raw weights 512 illustrates a first sum (e.g., $\alpha_{sum}$) of the raw weights $\alpha_1$-$\alpha_3$ along with a proportion of each raw weight $\alpha_1$-$\alpha_3$ relative to the first sum $\alpha_{sum}$. To determine the weighted sum of the directional outputs 124a-124c, the device 102 may normalize the raw weights $\alpha_1$-$\alpha_3$ by dividing the raw weights $\alpha_1$-$\alpha_3$ by the first sum $\alpha_{sum}$. For example, normalized weights 514 illustrates a second sum (e.g., $\beta_{sum}$) of the normalized weights $\beta_1$-$\beta_3$, with the second sum $\beta_{sum}$ equal to a value of one. Thus, the device 102 determines the first normalized weight $\beta_1$ by dividing the first raw weight $\alpha_1$ by the first sum $\alpha_{sum}$, the second normalized weight $\beta_2$ by dividing the second raw weight $\alpha_2$ by the first sum $\alpha_{sum}$, and the third normalized weight $\beta_3$ by dividing the third raw weight $\alpha_3$ by the first sum $\alpha_{sum}$. As a result, the normalized weights $\beta_1$-$\beta_3$ indicate a proportion of the raw weights $\alpha_1$-$\alpha_3$ relative to the first sum $\alpha_{sum}$ of the raw weights.

As illustrated in FIG. 5, a beam combiner 516 may combine portions of the directional outputs $S_1$-$S_3$ to generate the combined output $S_m$. For example, the combined output $S_{out}$ may include a first portion (e.g., first normalized weight $\beta_1$ multiplied by the first directional output $S_1$), a second portion (e.g., second normalized weight $\beta_2$ multiplied by the second directional output $S_2$) and a third portion (e.g., third normalized weight $\beta_3$ multiplied by the third directional output $S_3$). Thus, the combined output $S_{out}$ is composed of the directional outputs $S_1$-$S_3$ based on a weighting that corresponds to a signal metric (e.g., signal to noise ratio (SNR), magnitude of power or the like) of the directional outputs $S_1$-$S_3$.

Using the weighted sum technique illustrated in FIG. 5, the output generator 126 may determine weights (e.g., normalized weight $\beta$) for the directional outputs 124 that vary over time. For example, the output generator 126 may determine a first weight $\beta_1$ for a time index "n," a second weight $\beta_2$ for a time index "n+1," a third weight $\beta_3$ for a time index "n+2," and so on, which may be represented as $b_i[n]$. Thus, the combined output $S_{out}$ may be generated according to:

$$s[n] = \sum_{i=1}^{M} \beta_i s_i[n] \qquad [9]$$

with $s_i[n]$ the ith directional output (e.g., beam from the beamformer, although the disclosure is not limited thereto) and $\beta_i$ a corresponding weight.

As the weights $\beta_i$ vary over time, a more accurate representation is:

$$\beta_{r,i}[n] = \rho_1 \beta_{r,i}[n-1] + (1-\rho_1)\beta_i \qquad [10.1]$$

$$s_r[n] = \rho_2 s_r[n-1] + (1-\rho_2)\sum_{i=1}^{M} s_i[n] \qquad [10.2]$$

where $\beta_{r,i}[n]$ is the recursive weight (e.g., weight smoothed over time) for the ith directional output at a current time index n, $\beta_{r,i}[n-1]$ is the recursive weight for the ith directional output at a previous time index n−1, $\rho_1$ is a first smoothing parameter (e.g., smoothing value), $\beta_i$ is an instantaneous weight (e.g., weight calculated above using Equation 4) for the current time index n, $s_r[n]$ is the recursive combined output (e.g., combined output smoothed over time) at the current time index n, $s_r[n-1]$ is the recursive combined output at the previous time index n−1, $\rho_2$ is a second smoothing parameter, and $s_i[n]$ the ith directional output. Thus, instead of determining the combined output s[n] based on the instantaneous weights (e.g., $\beta_i$) and instantaneous directional outputs (e.g., $s_i[n]$) as illustrated in Equation 9, the device 102 may determine a recursive combined output $s_r[n]$ and recursive weight $\beta_{r,i}$ by factoring in previous time indexes.

Thus, to improve a quality of the second audio output 128b, the device 102 may control a rate of growth and/or a rate of decay of the second audio output 128b (e.g., recursive combined output $s_r[n]$) using recursive weights $\beta_{r,i}$. A smaller smoothing parameter (e.g., $\rho_1$ or $\rho_2$ closer to 0) provides less smoothing and prioritizes the instantaneous values of the weights and directional outputs $s_i[n]$, whereas a larger smoothing parameter (e.g., $\rho_1$ or $\rho_2$ closer to 1) provides greater smoothing and prioritizes previous values of the recursive weights $\beta_{r,i}[n]$ and previous values of the recursive combined output $s_r[n]$. As the recursive weights $\beta_{r,i}[n]$ and recursive combined output $s_r[n]$ are determined recursively, the first smoothing parameter $\rho_1$ and the second smoothing parameter $\rho_2$ may be determined based on a desired number of iterations and therefore a duration of time. For example, if the device 102 wants to smooth the recursive weights $\beta_{r,i}[n]$ and recursive combined output $s_r[n]$ using values over the past 100 ms, the device 102 may use a smoothing parameter value of $\rho=0.9$. If the device 102 wants to smooth the recursive weights $\beta_{r,i}[n]$ and recursive combined output $s_r[n]$ using values over the past 200 ms, the device 102 may use a smoothing parameter value of $\rho=0.95$.

As described above, the weights $\beta_i$ may be determined based on a magnitude of power or SNR value corresponding to a directional output. However, changing the weights too rapidly may result in artifacts or other degradations of the combined output $S_{out}$. To improve a quality of the combined output $S_{out}$, the device 102 may control a rate of change of a weight $b_1$ by only increasing or decreasing a raw weight $\alpha_i$ up to a fixed percentage. For example, to control a rate of change when a power (e.g., $p_i$) of a directional output $S_i$ is decreasing, the device 102 may select a decay parameter value $\lambda$ that is a positive constant less than one (e.g., 0.98) and prevent the raw weight $\alpha_i$ from decreasing by more than the decay parameter value $\lambda$. Additionally or alternatively, the device 102 may use the decay parameter value $\lambda$ to have a fixed rate of change when the raw weight $\alpha_i$ is decreasing. For example, if the power $p_i$ of a directional output $S_i$ is decreasing (e.g., $p_i[n]<p_i[n-1]$), the device 102 may determine the raw weight $\alpha_i$ using the decay parameter value $\lambda$ (e.g., $\alpha_i=\lambda \alpha_i[n-1]$). Thus, the raw weight $\alpha_i$ (and therefore the normalized weight $b_i$) may increase without restriction but may only decrease at a constant rate, as shown in equation 11:

$$\alpha_i[n] = \begin{cases} \gamma_i p_i[n], & \text{if } p_i[n] > p_i[n-1] \\ \lambda \cdot \alpha_i[n-1], & \text{otherwise} \end{cases} \qquad [11]$$

While the example illustrated above and equation 11 controls the rate of decay, the disclosure is not limited thereto and the device 102 may control the rate of decay and/or a rate of growth without departing from the disclosure.

FIGS. 6A-6B illustrate examples of controlling a rate of change of weights according to embodiments of the present disclosure. In the examples illustrated in FIG. 6A-6B, the device 102 may control a rate of decay without limiting a rate of growth. For example, the device 102 may continue to determine a raw weight $\alpha_i$ of a directional output $S_i$ based on a power $p_i$ of the directional output $S_i$ when the power $p_i$ is increasing. As illustrated in FIG. 6A, when the power $p_i$ is increasing (e.g., $p_i[n-1]<p_i[n]$), as shown in power chart 610, the device 102 may determine the raw weight $\alpha_i$ by multiplying the power $p_i$ by a variable $\gamma_i$. Thus, $\alpha_i[n-1]=\gamma_i p_i[n-1]$ and $\alpha_i[n]=\gamma_i p_i[n]$, as shown in raw weight chart 612.

In contrast, the device 102 may control a rate of decay by limiting a rate of change for the raw weight $\alpha_i$ when the when the power $p_i$ is decreasing. As illustrated in FIG. 6B, when the power $p_i$ is decreasing (e.g., $p_i[n-1]>p_i[n]$), as shown in power chart 630, the device 102 may determine a raw weight $\alpha_i[n]$ by multiplying the previous raw weight $\alpha_i[n-1]$ by a decay parameter value $\lambda$ that is a positive constant less than one (e.g., 0.98). Thus, $\alpha_i[n-1]=\gamma_i \, p_i[n-1]$, but $\alpha_i[n]=\lambda \, \alpha_i[n-1]$, as shown in raw weight chart 632.

Figure 7:
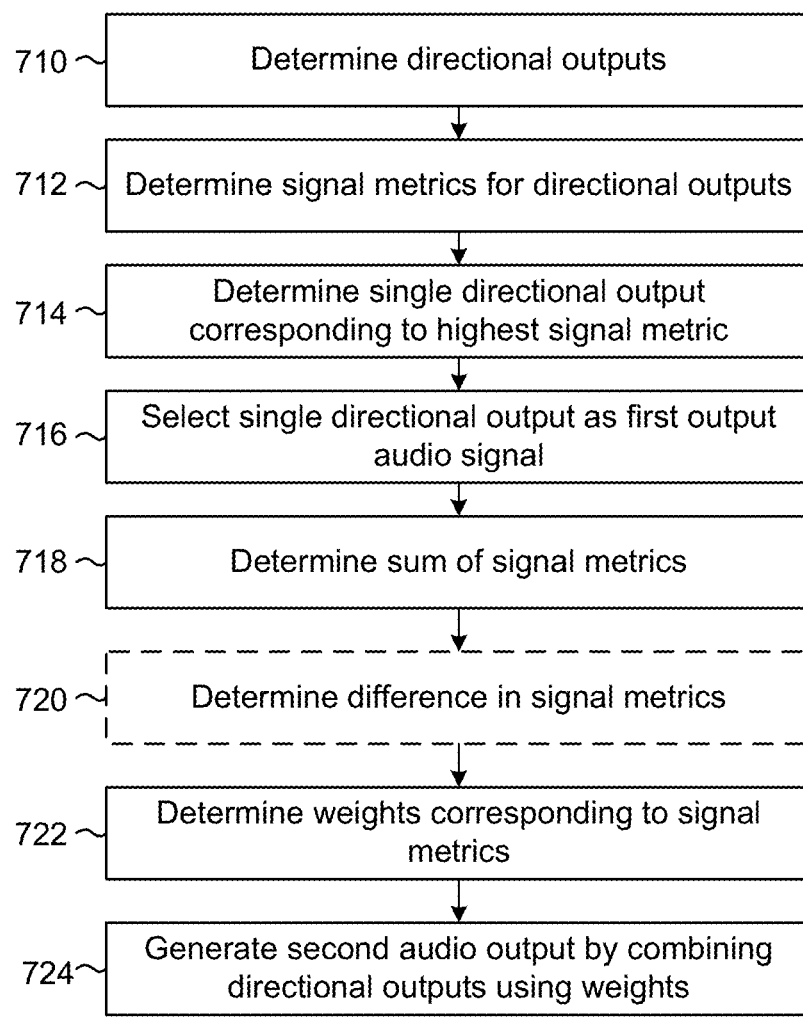
FIG. 7 is a flowchart conceptually illustrating an example method for generating a combined output using a weighted sum technique according to embodiments of the present disclosure.

FIG. 7 is a flowchart conceptually illustrating an example method for generating a combined output using a weighted sum technique according to embodiments of the present disclosure. As illustrated in FIG. 7, the device 102 may determine (710) directional outputs 124. For example, the device 102 may receive audio input from the microphones 118, may perform audio beamforming to separate the audio input into separate directions, may determine target signal(s) 122 and reference signal(s) 123, remove an echo from the target signal(s) 122 by removing the reference signal(s) 123 to isolate speech or additional sounds, and may generate the directional outputs 124.

The device 102 may determine (712) signal metrics for the directional outputs 124, such as signal to noise ratios (SNRs) or a magnitude of power associated with the directional outputs 124. For example, the device 102 may determine a first SNR associated with the first directional output 124a, a second SNR associated with a second directional output 124b, etc. However, SNR is just a single example of a parameter or characteristic associated with the directional outputs 124 and the present disclosure is not limited thereto. Instead of using SNRs, the device 102 may compare the directional outputs 124 using other characteristics or parameters (e.g., signal strength, power, etc.).

The device 102 may determine (714) a single directional output corresponding to a highest signal metric and may select (716) the single directional output as a first audio output 128a. For example, the device 102 may determine that the second SNR associated with the second directional output 124b is the largest SNR value of the directional outputs 124 and may select the second directional output 124b as the first audio output 128a.

The device 102 may determine (718) a sum of the signal metrics. For example, the device 102 may add the first SNR, the second SNR and so on until the mth SNR to generate a sum (e.g., $\alpha_{sum}$). In some examples, the device 102 may multiply the signal metrics by a variable (e.g., $\gamma_i$), as discussed above.

The device 102 may optionally determine (720) a difference in signal metrics and/or weights. For example, the device 102 may perform the technique illustrated above with regard to FIGS. 6A-6B to control a rate of growth and/or a rate of decay. The device 102 may determine (722) weights corresponding to the signal metrics and, optionally, the controlled rate of growth/decay. In some examples, the device 102 may determine the weights solely based on the signal metrics, as discussed above with regard to equations 4-10. For example, the device 102 may use the first SNR to determine a first weight corresponding to the first directional output 124a, use the second SNR to determine a second weight corresponding to the second directional output 124b, and so on. However, the device 102 may optionally perform step 720 and determine the weights based on the controlled rate of growth and/or rate of decay, as discussed above with regard to equation 11. For example, the device 102 may determine that the first SNR of the first directional output 124a is decreasing and may determine the first weight (e.g., $\alpha_i[n-1]$) by multiplying a previous weight (e.g., $\alpha_i[n]$) of the first directional output 124a by a decay parameter value $\lambda$ that is a positive constant less than one (e.g., 0.98).

The device 102 may generate (724) a second audio output 128b by combining the directional outputs 124 using the weights. For example, the device 102 may generate the second audio output 128b by multiplying the directional outputs 124 by corresponding weights (e.g., first directional output 124a multiplied by the first weight, second directional output 124b multiplied by the second weight, etc.) and summing the products, as discussed above with regard to equations 3 and/or 9.

In the equal weighting technique, the device 102 may attempt to preserve a loudness of each talker when generating the second audio output 128b. Thus, instead of determining individual weights based on corresponding signal metrics, the device 102 may select a first group of directional outputs to have a first weight and a second group of directional outputs to have a second weight. As a result, the second audio output 128b will preserve a loudness of each of the first group of directional inputs (relative to each other) while reducing a loudness of ambient noise and reverberation.

To perform the equal weighting technique, the device 102 may determine signal metrics (e.g., SNR values) for individual directional outputs 124 and separate the directional outputs 124 into groups based on the signal metrics. For example, the device 102 may separate the directional outputs 124 into the first group (e.g., SET1) and the second group (e.g., SET2) using a fixed threshold. Thus, directional outputs 124 having a signal metric above the fixed threshold are associated with the first group and directional outputs 124 having a signal metric below the fixed threshold are associated with the second group. The first group may collectively get a first total weight $w_{tot1}$ (e.g., $w_{tot1}=0.7$) and the second group may collectively get a second total weight $w_{tot2}$ (e.g., $w_{tot2}=0.3$), with the first total weight $w_{tot1}$ and the second total weight $w_{tot2}$ adding up to a value of one (e.g., $w_{tot1} \, w_{tot2}=1$). If there are P directional outputs 124 in the first group and Q directional outputs 124 in the second group (for a total number of directional outputs 124 equal to P+Q), the device 102 may determine a first individual weight $w_{ind1}$ of the first group as:

$$w_{ind1} = \frac{w_{tot1}}{P} \quad [12.1]$$

and a second weight of the second group as:

$$w_{ind2} = \frac{w_{tot2}}{Q} \quad [12.2]$$

Thus, if there are six directional outputs (e.g., 124a-124f) and the device 102 associates three directional outputs (e.g., 124a-124c) with the first group SET1 having a first total weight $w_{tot1}$ of 0.7 and three directional outputs (e.g., 124d-124f) with the second group SET2 having a second total weight $w_{tot2}$ of 0.3, the first individual weight $w_1$ may be equal to 0.233 and the second individual weight $w_{ind2}$ may be equal to 0.1.

As discussed above, a weight $w_1$ for an ith directional output 124 may be determined over time. Thus, while the first directional output 124a is included in the first group, a corresponding weight $w_1$ may be equal to the first individual weight $w_{ind1}$ (e.g., $w_1(n)=w_{d1}$). However, when the first directional output 124a changes to the second group, the first weight $w_1$ may be equal to the second individual weight $w_{ind2}$ (e.g., $w_1(n+1)=w_{ind2}$). As discussed above with regard to FIGS. 6A-6B, changing the weights too rapidly may result in artifacts or other degradations of the second audio output 128b. Thus, to improve a quality of the second audio output 128b, the device 102 may control a rate of growth and/or a rate of decay. For example, if a weight $w_i[n]$ increased (e.g., a directional output changes from the second group to the first group) or decreased (e.g., a directional output changes from the first group to the second group), the device 102 may apply a third smoothing parameter (e.g., time constant) to smooth the transition:

$$s_i[n]=\rho_3 s_i[n-1]+(1-\rho_3)w_i[n] \quad [13]$$

In some examples, the device 102 may select the third smoothing parameter $\rho_3$ to be a slow time constant $\rho_{slow}$ when the directional output changed sets within the last K frames (e.g., directional output changes from the second group to the first group or vice versa) and a normal time constant $\rho_{norm}$ otherwise, where the slow time constant $\rho_{slow}$ is larger than the normal time constant $\rho_{norm}$ (e.g., $\rho_{slow} < \rho_{norm}$).

A smaller time constant (e.g., third smoothing parameter $\rho_3$ closer to 0) provides less smoothing and prioritizes the instantaneous values of the weights $w_i[n]$, whereas a larger time constant (e.g., third smoothing parameter $\rho_3$ closer to 1) provides greater smoothing and prioritizes previous values of the directional output $s_i$. As the directional output $s_i$ is determined recursively, the third smoothing parameter $\rho_3$ may be determined based on a desired number of iterations and therefore a duration of time. For example, if the device 102 wants to smooth the directional output $s_i$ using values over the past 100 ms, the device 102 may use a third smoothing parameter value of $\rho_3=0.9$. If the device 102 wants to smooth the directional output $s_i$ using values over the past 200 ms, the device 102 may use a third smoothing parameter value of $\rho_3=0.95$. Therefore, when the directional output has not changed sets within the last K frames, the device may select the normal time constant $\rho_{norm}$ to be a first value (e.g., 0.9) that corresponds to a first period of time (e.g., 100 ms), whereas when the directional output has changed sets within the last K frames, the device 102 may select the slow time constant $\rho_{slow}$ to be a larger value (e.g., 0.95), which corresponds to a longer period of time (e.g., 200 ms) in order to lessen the impact of the instantaneous values of the weights $w_i[n]$.

In some examples, the device 102 may generate a first output $S_{out1}$ using a sum of the directional outputs 124 and output the first output $S_{out1}$ as the second audio output 128b:

$$S_{out1}[n]=\Sigma s_i[n] \quad [14]$$

However, in other examples the second audio output 128b may smooth the first output $S_{out1}$ to generate a second output $S_{out2}$ to output as the second audio output 128b:

$$S_{out2}[n]=\rho_4 S_{out2}[n-1]+(1-\rho_4)S_{out1}[n] \quad [15]$$

where $\rho_4$ is a fourth smoothing parameter between zero and one. Thus, a smaller smoothing parameter (e.g., $\rho_4$ closer to 0) provides less smoothing and prioritizes the instantaneous values of the first output $S_{out1}$, whereas a larger smoothing parameter (e.g., $\rho_4$ closer to 1) provides greater smoothing and prioritizes previous values of the second output $S_{out2}$. As the second output $S_{out2}$ is determined recursively, the fourth smoothing parameter $\rho_4$ may be determined based on a desired number of iterations and therefore a duration of time. For example, if the device 102 wants to smooth the second output $S_{out2}$ using values over the past 100 ms, the device 102 may use a smoothing parameter of $\rho_4=0.9$. If the device 102 wants to smooth the second output $S_{out2}$ using values over the past 200 ms, the device 102 may use a smoothing parameter of $\rho_4=0.95$.

Figure 8:
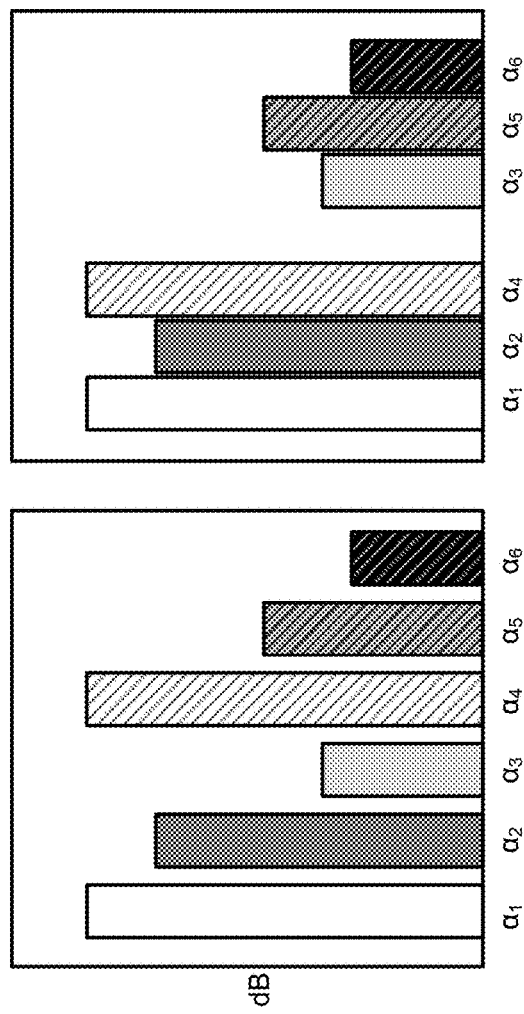
FIG. 8 illustrates an example of generating a combined output using an equal weighting technique according to embodiments of the present disclosure.

FIG. 8 illustrates an example of generating a combined output using an equal weighting technique 800 according to embodiments of the present disclosure. FIG. 8 illustrates six directional outputs (e.g., 124a-124f, which are represented as $S_1$-$S_6$) being combined into a single audio output 128b (e.g., $S_{out}$). As illustrated in FIG. 8, the device 102 may determine a first signal metric $\alpha_1$ corresponding to a first directional output 124a (e.g., $S_1$), a second signal metric $\alpha_2$ corresponding to a second directional output 124b (e.g., $S_2$), and so on for signal metrics $\alpha_1$-$\alpha_6$, as illustrated in signal metric chart 810. In some examples, the signal metrics $\alpha_1$-$\alpha_6$ may be determined using equation 6.1 or 6.2 discussed above, although the disclosure is not limited thereto. After determining the signal metrics $\alpha_1$-$\alpha_6$, the device 102 may group the directional outputs 124 based on the signal metrics $\alpha_1$-$\alpha_6$. For example, group chart 812 illustrates a first group including directional outputs $S_1$, $S_2$ and $S_4$, along with a second group including directional outputs $S_3$, $S_5$ and $S_6$. As illustrated in group chart 812, the signal metrics $\alpha_1$, $\alpha_2$ and $\alpha_4$ are larger than the signal metrics $\alpha_3$, $\alpha_5$ and $\alpha_6$.

After grouping the directional outputs $S_1$-$S_6$, the device 102 may assign a first weight ($\beta_1$) to the first group and a second weight ($\beta_2$) to the second group, as illustrated by Weights 814. The first group may have a first total weight $\beta_{tot1}$ (e.g., 0.7) while the second group may have a second total weight $\beta_{tot2}$ (e.g., 0.3). Thus, in this example, the first weight ($\beta_1$) may be approximately 0.233 and the second weight ($\beta_2$) may be approximately 0.1.

The device 102 may multiply the first directional output 124a (e.g., $S_1$) by the first weight $\beta_1$ to generate a first product. multiply the second directional output 124b (e.g., $S_2$) by the first weight $\beta_1$ to generate a second product. and multiply the fourth directional output 124d (e.g., $S_4$) by the first weight $\beta_1$ to generate a third product. Similarly, the device 102 may multiply the third directional output 124c (e.g., $S_3$) by the second weight $\beta_2$ to generate a fourth product, multiply the fifth directional output 124e (e.g., $S_5$) by the second weight $\beta_2$ to generate a fifth product. and multiply the sixth directional output 124f (e.g., $S_6$) by the second weight $\beta_2$ to generate a sixth product. The device 102 may determine the combined output (e.g., $S_{out}$) by summing portions of the directional outputs $S_1$-$S_6$ (e.g., products), as illustrated by beam combiner 816.

While FIG. 8 illustrates the device 102 separating the six directional outputs 124a-124f equally into two groups, the disclosure is not limited thereto. FIG. 9 illustrates an example of different grouping configurations according to embodiments of the present disclosure. As illustrated in FIG. 9, the device 102 may use a 2/4 configuration 910 and select two directional outputs (e.g., 124a and 124d) in the first group and the remaining four directional outputs (e.g., 124b, 124c, 124e and 124f) in the second group, as shown by group chart 912. As the first total weight $\beta_{tot1}$ and the second total weight $\beta_{tot2}$ remain fixed, the first weight $\beta_1$ is increased (e.g., $\beta_1=0.7/2=0.35$) and the second weight is decreased (e.g., $\beta_2=0.3/4=0.075$).

Additionally or alternatively, the device 102 may use a 3/3 configuration 920 and select three directional outputs (e.g., 124a, 124b and 124d) in the first group and the remaining three directional outputs (e.g., 124c, 124e and 124f) in the second group, as shown by group chart 922. As the first total weight $\beta_{tot1}$ and the second total weight $\beta_{tot2}$ remain fixed, the first weight $\beta_1$ is decreased (e.g., $\beta_1=0.7/3=0.233$) and the second weight is increased (e.g., $\beta_2=0.3/3=0.1$).

Additionally or alternatively, the device 102 may use a 4/2 configuration 930 and select four directional outputs (e.g., 124a, 124b, 124d and 124e) in the first group and the remaining two directional outputs (e.g., 124c and 124f) in the second group, as shown by group chart 932. As the first total weight $\beta_{tot1}$ and the second total weight $\beta_{tot2}$ remain fixed, the first weight $\beta_1$ is decreased (e.g., $\beta_1=0.7/4=0.175$) and the second weight is increased (e.g., $\beta_2=0.3/2=0.15$).

The examples illustrated in FIG. 9 are based on six directional outputs and are included for ease of illustration; the disclosure is not limited thereto. For example, the device 102 may generate any number of directional outputs and may group the directional outputs using one or more configurations, such that a number of directional outputs in each group may vary and/or be the same.

Figure 10:
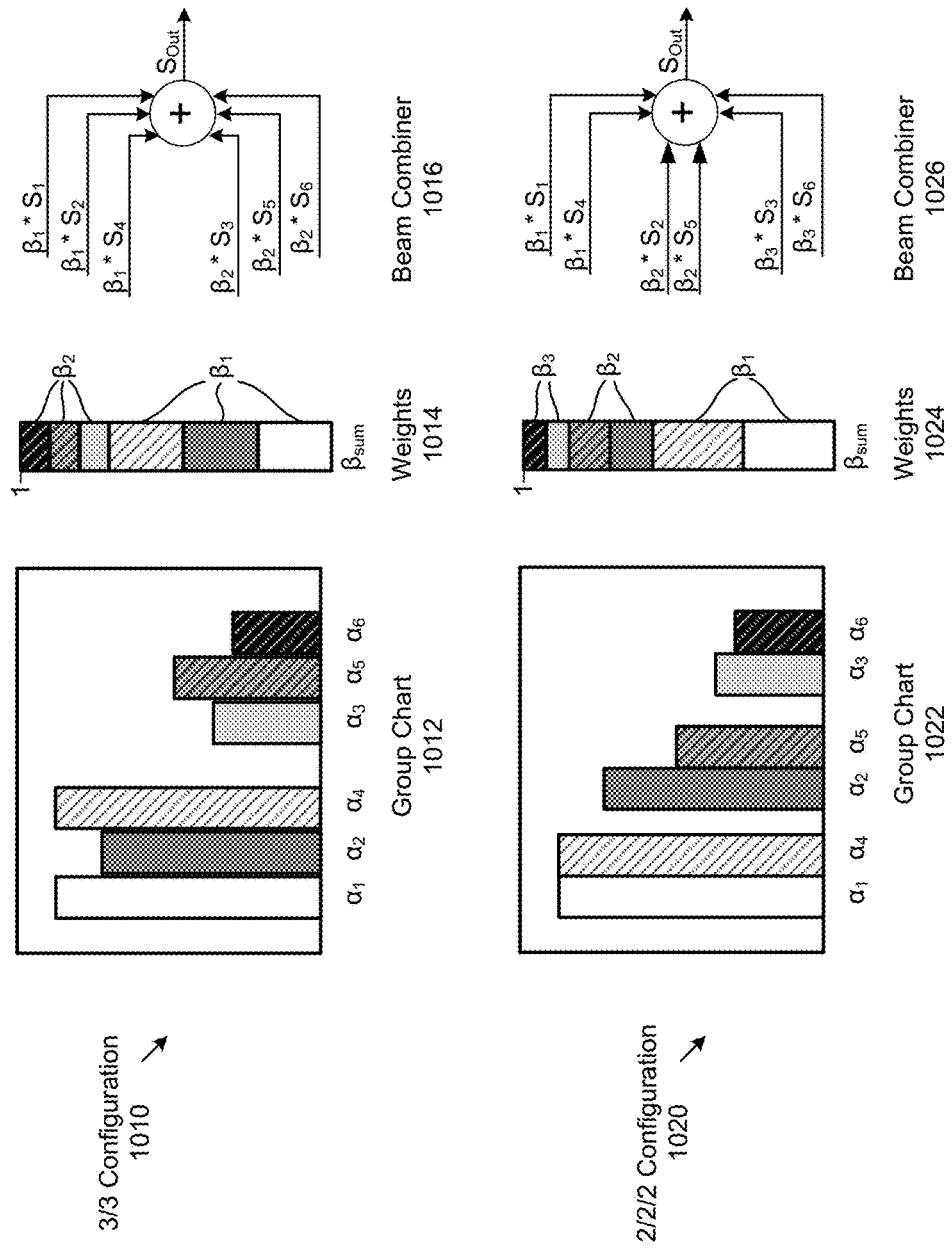
FIG. 10 illustrates an example of different weighting configurations according to embodiments of the present disclosure.

FIG. 10 illustrates an example of different weighting configurations according to embodiments of the present disclosure. In addition to varying the number of directional outputs in each group, the device 102 may vary a number of groups to separate the directional outputs. As illustrated in FIG. 10, the device 102 may use a 3/3 configuration 1010 and select three directional outputs (e.g., 124a, 124b and 124d) in the first group and the remaining three directional outputs (e.g., 124c, 124e and 124f) in the second group, as shown by group chart 1012.

After grouping the directional outputs $S_1$-$S_6$, the device 102 may assign a first weight ($\beta_1$) to the first group and a second weight ($\beta_2$) to the second group, as illustrated by Weights 1014. The first group may have a first total weight $\beta_{tot1}$ (e.g., 0.7) while the second group may have a second total weight $\beta_{tot2}$ (e.g., 0.3). Thus, in this example, the first weight ($\beta_1$) may be approximately 0.233 and the second weight ($\beta_2$) may be approximately 0.1.

The device 102 may multiply the first directional output 124a (e.g., $S_1$) by the first weight $\beta_1$ to generate a first product. multiply the second directional output 124b (e.g., $S_2$) by the first weight $\beta_1$ to generate a second product. and multiply the fourth directional output 124d (e.g., $S_4$) by the first weight Pi to generate a third product. Similarly, the device 102 may multiply the third directional output 124c (e.g., $S_3$) by the second weight $\beta_2$ to generate a fourth product, multiply the fifth directional output 124e (e.g., $S_5$) by the second weight $\beta_2$ to generate a fifth product. and multiply the sixth directional output 124f (e.g., $S_6$) by the second weight $\beta_2$ to generate a sixth product. The device 102 may determine the combined output (e.g., $S_{out}$) by summing portions of the directional outputs $S_1$-$S_6$ (e.g., products), as illustrated by beam combiner 1016.

Additionally or alternatively, the device 102 may use a 2/2/2 configuration 1020 and select two directional outputs (e.g., 124a and 124d) in a first group, two directional outputs (e.g., 124b and 124e) in a second group and the remaining two directional outputs (e.g., 124c, and 124f) in a third group, as shown by group chart 1022.

After grouping the directional outputs $S_1$-$S_6$, the device 102 may assign a first weight ($\beta_1$) to the first group, a second weight ($\beta_2$) to the second group and a third weight ($\beta_3$) to the third group, as illustrated by Weights 1024. The first group may have a first total weight $\beta_{tot1}$ (e.g., 0.6), the second group may have a second total weight $\beta_{tot2}$ (e.g., 0.3) and the third group may have a third total weight $\beta_{tot3}$ (e.g., 0.1). Thus, in this example, the first weight ($\beta_1$) may be approximately 0.3, the second weight ($\beta_2$) may be approximately 0.15 and the third weight ($\beta_3$) may be approximately 0.05.

The device 102 may multiply the first directional output 124a (e.g., $S_1$) by the first weight $\beta_1$ to generate a first product and multiply the fourth directional output 124d (e.g., $S_4$) by the first weight $\beta_1$ to generate a second product. Similarly, the device 102 may multiply the second directional output 124b (e.g., $S_2$) by the second weight $\beta_2$ to generate a third product and multiply the fifth directional output 124e (e.g., $S_5$) by the second weight $\beta_2$ to generate a fourth product. Finally, the device 102 may multiply the third directional output 124c (e.g., $S_3$) by the third weight $\beta_3$ to generate a fifth product and multiply the sixth directional output 124f (e.g., $S_6$) by the third weight $\beta_3$ to generate a sixth product. The device 102 may determine the combined output (e.g., $S_{out}$) by summing portions of the directional outputs $S_1$-$S_6$ (e.g., products), as illustrated by beam combiner 1026.

The examples illustrated in FIG. 10 are based on six directional outputs and are included for ease of illustration; the disclosure is not limited thereto. For example, the device 102 may generate any number of directional outputs and may group the directional outputs using one or more configurations, such that a number of groups may vary.

FIG. 11 illustrates an example of different thresholds used in the equal weighting technique according to embodiments of the present disclosure. As illustrated in FIG. 11, the device 102 may separate directional outputs 124a-124f using a first technique (e.g., fixed number 1110), a second technique (e.g., static threshold 1120), and/or a third technique (e.g., dynamic threshold 1130).

As illustrated in FIG. 11, the first technique (e.g., fixed number 1110) may select a fixed number (e.g., three) of directional outputs in each group, regardless of a range of values of the signal metrics $\alpha_1$-$\alpha_6$. For example, signal metric chart 1112 illustrates that the device 102 may select three signal metrics in each group and group chart 1114 illustrates that the device 102 selects the three highest signal metrics (e.g., $\alpha_1$, $\alpha_2$ and $\alpha_4$) as a first group and the three lowest signal metrics (e.g., $\alpha_3$, $\alpha_5$ and $\alpha_6$) as a second group. While FIG. 11 illustrates the three highest signal metrics (e.g., $\alpha_1$, $\alpha_2$ and $\alpha_4$) being relatively similar in value, the device 102 would select the three highest signal metrics regardless of a gap between the first highest signal metric (e.g., $\alpha_1$) and the second highest signal metric (e.g., $\alpha_4$) or a gap between the second highest signal metric (e.g., $\alpha_4$) and the third highest signal metric (e.g., $\alpha_2$).

In contrast, the second technique (e.g., static threshold 1120) may select a variable number of directional outputs in each group based on a static threshold 1120. For example, signal metric chart 1122 illustrates the static threshold 1120 between the second signal metric (e.g., $\alpha_2$) and the fifth signal metric (e.g., $\alpha_5$). Thus, group chart 1124 illustrates that the device 102 selects the signal metrics (e.g., $\alpha_1$, $\alpha_2$ and $\alpha_4$) above the static threshold 1120 as a first group and the signal metrics (e.g., $\alpha_3$, $\alpha_5$ and $\alpha_6$) below the static threshold 1120 as a second group. Depending on a value of the static threshold 1120, the device 102 may select additional directional outputs in the first group and/or second group. For example, if the static threshold 1120 was higher, the device 102 may only select the first signal metric (e.g., $\alpha_1$) and the fourth signal metric (e.g., $\alpha_4$) in the first group, including the second signal metric (e.g., $\alpha_2$) in the second group.

While the static threshold 1120 may separate directional outputs using a fixed threshold, the static threshold 1120 may not intelligently separate the directional outputs based on relative signal metrics of the directional outputs. In contrast, the third technique (e.g., dynamic threshold 1130) may select a variable number of directional outputs in each group based on a dynamic threshold 1130 that takes into account differences between signal metrics. For example, the device 102 may determine a first grouping of signal metrics (e.g., $\alpha_1$, $\alpha_2$, $\alpha_4$ and $\alpha_5$) within a threshold of each other, a second grouping of signal metrics (e.g., $\alpha_3$ and $\alpha_6$) and that there is a gap between the first grouping and the second grouping, as illustrated in signal metric chart 1132. Based on the groupings and the gap between the groupings, the device 102 may select signal metrics (e.g., $\alpha_1$, $\alpha_2$, $\alpha_4$ and $\alpha_5$) as a first group and signal metrics (e.g., $\alpha_3$ and $\alpha_6$) as a second group. While the example illustrated in FIG. 11 results in a 4/2 configuration, the device 102 may select other configurations as the signal metrics vary. For example, if the fifth signal metric $\alpha_5$ decreases over time, the device 102 may determine that a gap between the second signal metric $\alpha_2$ and the fifth signal metric $\alpha_5$ exceeds a threshold and may switch the fifth signal metric $\alpha_5$ to the second group, resulting in a 3/3 configuration. Additionally or alternatively, if the second signal metric $\alpha_2$ and the fifth signal metric $\alpha_5$ decrease over time, the device 102 may determine that a gap between the first signal metric $\alpha_1$ and the second signal metric $\alpha_2$ exceeds the threshold and the device 102 may switch to a 2/2/2 configuration. The device 102 may use other configurations without departing from the disclosure.

While FIG. 11 illustrates the device 102 separating directional outputs 124a-124f using instantaneous signal metric values (e.g., signal metric values at a given time), the disclosure is not limited thereto. Instead, the device 102 may include hysteresis or delay when separating the directional outputs 124a-124f so that the device 102 selects the groups based on previous history as well as current signal metric values. To illustrate an example using the first technique (e.g., fixed number 1110), the second signal metric $\alpha_2$ may be selected as part of the first group for a period of time before the second signal metric $\alpha_2$ drops below a third highest signal metric (e.g., fifth signal metric $\alpha_5$) and/or the fifth signal metric $\alpha_5$ exceeds the second signal metric $\alpha_2$. Despite the fifth signal metric $\alpha_5$ being larger than the second signal metric $\alpha_2$, the device 102 may continue to select the second signal metric $\alpha_2$ as part of the first group because the second signal metric $\alpha_2$ was previously part of the first group for the period of time. Additionally or alternatively, the device 102 may determine a weighted average over time for individual signal metrics and may group the directional outputs based on the weighted averages. Thus, the device 102 may incorporate previous history in determining the grouping so that rapid fluctuations in the signal metrics $\alpha$ do not result in regrouping the signal metrics $\alpha$. This hysteresis is beneficial in conversational environments where a first person may speak for a time and then a second person may respond; while the second signal metric $\alpha_2$ may be temporarily weak (e.g., second person is listening), the device 102 may want to include the second signal metric $\alpha_2$ as part of the first group for when the second signal metric $\alpha_2$ becomes strong again (e.g., second person is speaking).

Figure 12:
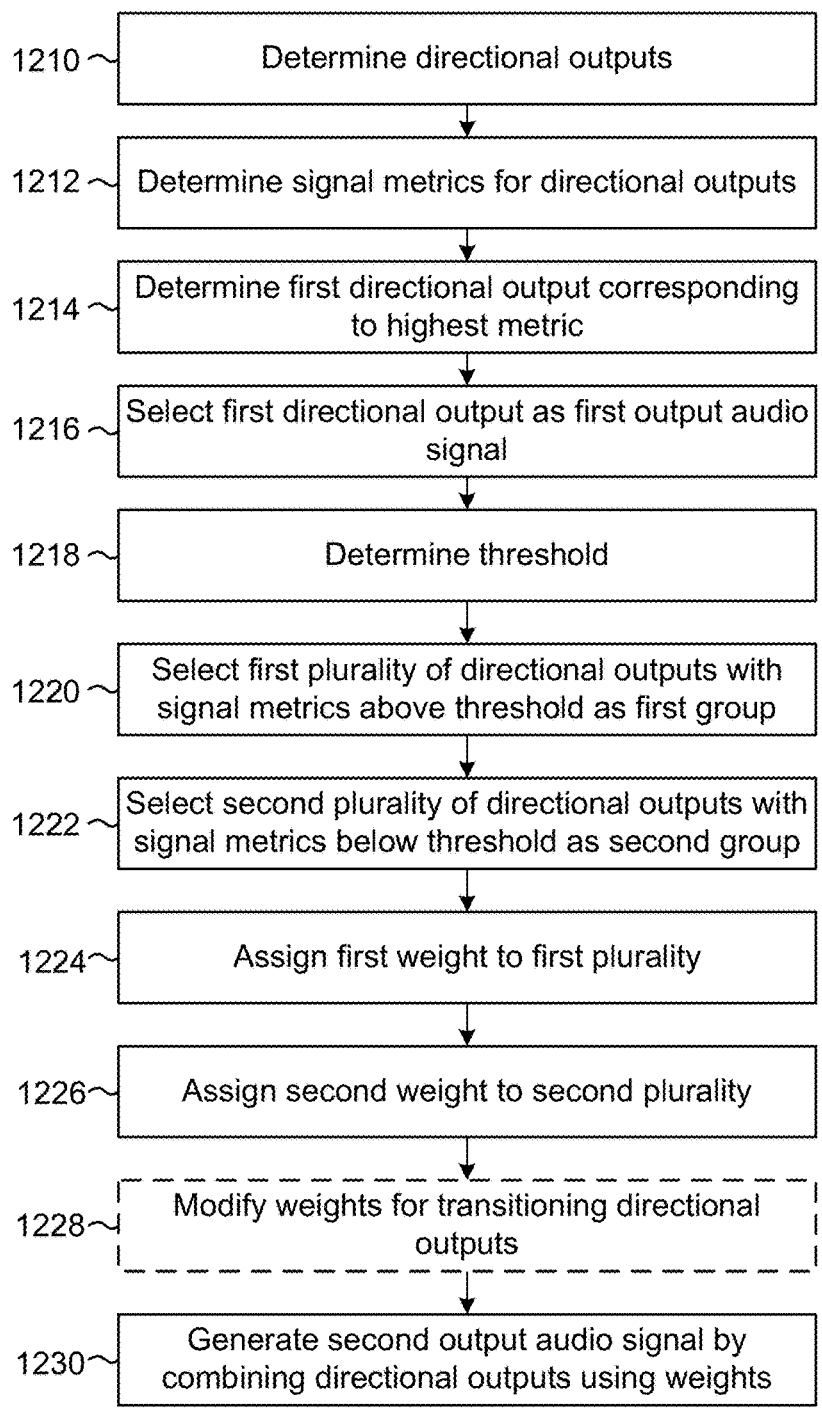
FIG. 12 is a flowchart conceptually illustrating an example method for generating a combined output using an equal weighting technique according to embodiments of the present disclosure.

FIG. 12 is a flowchart conceptually illustrating an example method for generating a combined output using an equal weighting technique according to embodiments of the present disclosure. As illustrated in FIG. 12, the device 102 may determine (1210) directional outputs 124. For example, the device 102 may receive audio input from the microphones 118, may perform audio beamforming to separate the audio input into separate directions, may determine target signal(s) 122 and reference signal(s) 123, remove an echo from the target signal(s) 122 by removing the reference signal(s) 123 to isolate speech or additional sounds, and may generate the directional outputs 124.

The device 102 may determine (1212) signal metrics for the directional outputs 124, such as signal to noise ratios (SNRs) or a magnitude of power associated with the directional outputs 124. For example, the device 102 may determine a first SNR associated with the first directional output 124a, a second SNR associated with a second directional output 124b, etc. However, SNR is just a single example of a parameter or characteristic associated with the directional outputs 124 and the present disclosure is not limited thereto. Instead of using SNRs, the device 102 may compare the directional outputs 124 using other characteristics or parameters (e.g., signal strength, power, etc.).

The device 102 may determine (1214) a single directional output corresponding to a highest signal metric and may select (1216) the single directional output as a first audio output 128a. For example, the device 102 may determine that the second SNR associated with the second directional output 124b is the largest SNR value of the directional outputs 124 and may select the second directional output 124b as the first audio output 128a.

The device 102 may determine (1218) a threshold, select (1220) a first plurality of directional outputs with signal metrics above the threshold and select (1222) a second plurality of directional outputs with signal metrics below the threshold. For example, the device 102 may use the techniques discussed above with regard to FIG. 11 to determine the threshold and separate the directional outputs into the first plurality and the second plurality. While not illustrated in steps 1220 and/or 1222, the device 102 may include hysteresis or delay when separating the directional outputs 124a-124f so that the device 102 selects the groups based on previous history as well as current signal metric values. For example, the device 102 may continue to select the second signal metric $\alpha_2$ as part of the first group for a duration of time after the second signal metric $\alpha_2$ justifies the second signal metric $\alpha_2$ being included in the second group. Additionally or alternatively, the device 102 may determine a weighted average over time for individual signal metrics and may select the first plurality of directional outputs and the second plurality of directional outputs based on the weighted averages.

The device 102 may assign (1224) a first weight to the first plurality of directional outputs and may assign (1226) a second weight to the second plurality of directional outputs. For example, the device 102 may determine a first total weight and a second total weight, determine the first weight using the first total weight and a first number of directional outputs in the first plurality, and determine the second weight using the second total weight and a second number of directional outputs in the second plurality, as discussed in greater detail above with regard to FIGS. 8-10. The device 102 may optionally modify (1228) weights for transitioning directional outputs (e.g., directional outputs switching from the first plurality to the second plurality or vice versa). For example, the device 102 may perform the technique illustrated above with regard to FIGS. 6A-6B and/or equation 13 to control a rate of growth and/or a rate of decay.

While steps 1220-1226 illustrate an example of the device 102 separating the directional outputs into two different groups, the disclosure is not limited thereto and the device 102 may separate the directional outputs into any number of groups without departing from the disclosure. For example, the device 102 may select a 3/3 configuration (e.g., two groups), a 2/2/2 configuration (e.g., three groups) or the like, as illustrated in FIG. 10. Additionally or alternatively, the device 102 may select various numbers of directional outputs in each of the groups, as illustrated in FIG. 9. For example, the device 102 may select a 2/4 configuration, a 3/3 configuration, a 4/2 configuration or any other combination of directional outputs.

The device 102 may generate (1230) a second audio output 128b by combining the directional outputs 124 using the weights. For example, the device 102 may generate the second audio output 128b by multiplying the directional outputs 124 by corresponding weights (e.g., first directional output 124a multiplied by a first weight, second directional output 124b multiplied by a second weight, etc.) and summing the products.

Figure 13:
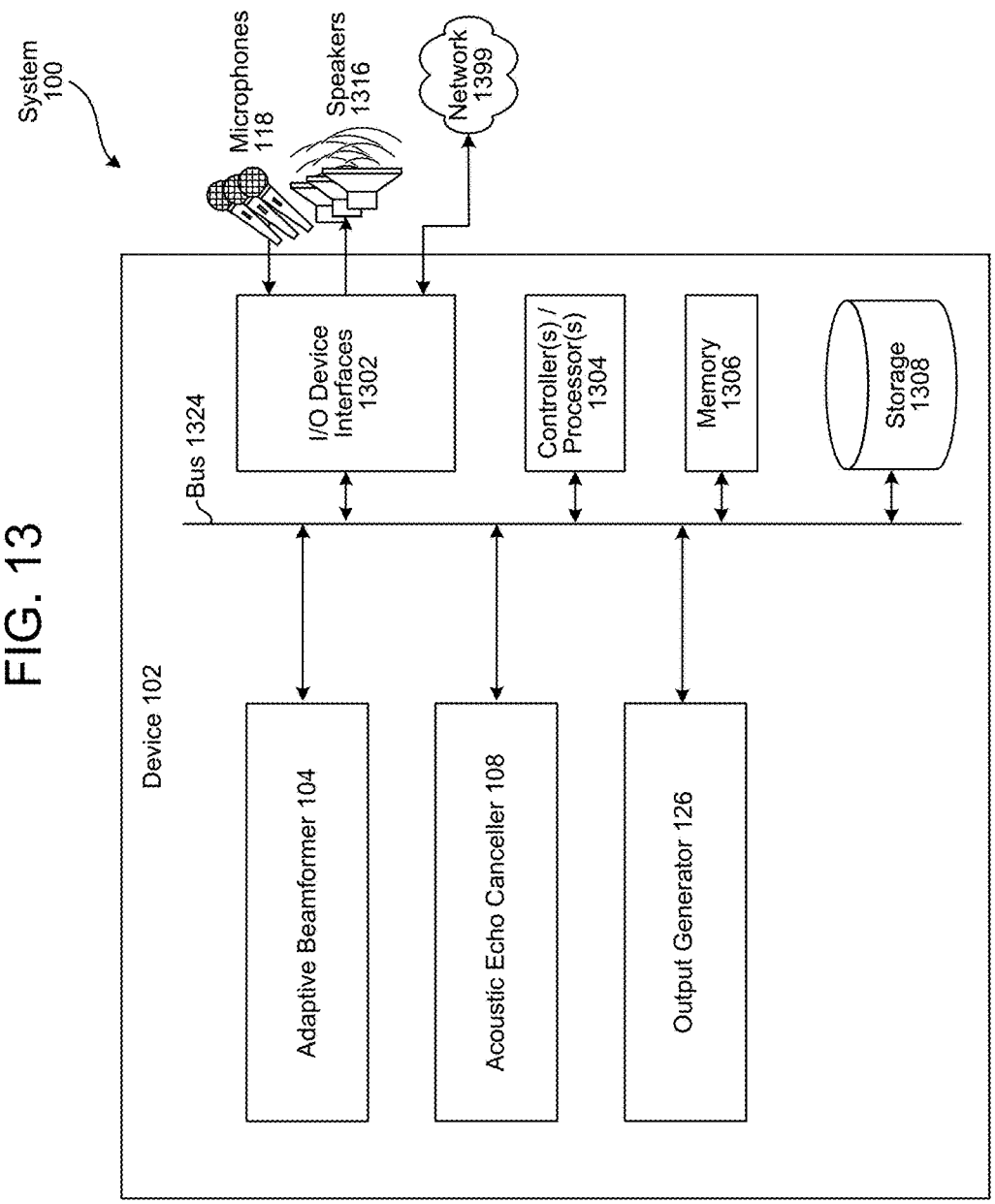
FIG. 13 is a block diagram conceptually illustrating example components of a system for echo cancellation according to embodiments of the present disclosure.

FIG. 13 is a block diagram conceptually illustrating example components of the system 100. In operation, the system 100 may include computer-readable and computer-executable instructions that reside on the device 102, as will be discussed further below.

The system 100 may include one or more audio capture device(s), such as a microphone 118 or an array of microphones 118. The audio capture device(s) may be integrated into the device 102 or may be separate.

The system 100 may also include an audio output device for producing sound, such as speaker(s) 1316. The audio output device may be integrated into the device 102 or may be separate.

The device 102 may include an address/data bus 1124 for conveying data among components of the device 102. Each component within the device 102 may also be directly connected to other components in addition to (or instead of) being connected to other components across the bus 1124.

The device 102 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAIVI) and/or other types of memory. The device 102 may also include a data storage component 1308, for storing data and controller/processor-executable instructions (e.g., instructions to perform the algorithms illustrated in FIGS. 1, 7 and/or 12). The data storage component 1308 may include one or more non-volatile storage types such as magnetic storage, optical storage, solid-state storage, etc. The device 102 may also be connected to removable or external non-volatile memory and/or storage (such as a removable memory card, memory key drive, networked storage, etc.) through the input/output device interfaces 1302.

Computer instructions for operating the device 102 and its various components may be executed by the controller(s)/processor(s) 1304, using the memory 1306 as temporary "working" storage at runtime. The computer instructions may be stored in a non-transitory manner in non-volatile memory 1306, storage 1308, or an external device. Alternatively, some or all of the executable instructions may be embedded in hardware or firmware in addition to or instead of software.

The device 102 includes input/output device interfaces 1302. A variety of components may be connected through the input/output device interfaces 1302, such as the speaker(s) 1316, the microphones 118, and a media source such as a digital media player (not illustrated). The input/output interfaces 1302 may include A/D converters for converting the output of microphone 118 into echo signals y 120, if the microphones 118 are integrated with or hardwired directly to device 102. If the microphones 118 are independent, the A/D converters will be included with the microphones 118, and may be clocked independent of the clocking of the device 102. Likewise, the input/output interfaces 1302 may include D/A converters for converting the reference signals x 112 into an analog current to drive the speakers 114, if the speakers 114 are integrated with or hardwired to the device 102. However, if the speakers 114 are independent, the D/A converters will be included with the speakers 114, and may be clocked independent of the clocking of the device 102 (e.g., conventional Bluetooth speakers).

The input/output device interfaces 1302 may also include an interface for an external peripheral device connection such as universal serial bus (USB), FireWire, Thunderbolt or other connection protocol. The input/output device interfaces 1302 may also include a connection to one or more networks 1399 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1399, the system 100 may be distributed across a networked environment.

The device 102 further includes an adaptive beamformer 104, an acoustic echo canceller (AEC) 108 and an output generator 126. The adaptive beamformer 104 includes a fixed beamformer (FBF) 105, a multiple input canceler (MC) 106 and a blocking matrix (BM) 107. The AEC 108 may include one or more discrete logic blocks used to perform acoustic echo cancellation.

Multiple devices 102 may be employed in a single system 100. In such a multi-device system, each of the devices 102 may include different components for performing different aspects of the AEC process. The multiple devices 102 may include overlapping components. The components of device 102 as illustrated in FIG. 13 is exemplary, and may be a stand-alone device or may be included, in whole or in part, as a component of a larger device or system. For example, in certain system configurations, one device 102 may transmit and receive the audio data, another device 102 may perform AEC, and yet another device 102 my use the audio outputs 128 for operations such as speech recognition. Additionally or alternatively, the system 100 may include a server (not shown) that performs functionality such as speech recognition. For example, the device 102 may capture audio data, generate audio outputs 128 and send the audio outputs 128 to the server for automatic speech recognition. The server may receive the audio outputs 128, perform automatic speech recognition to determine text and/or commands corresponding to the text and may send the text/commands to the device 102 for further processing.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the Acoustic Echo Canceller 108 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating different audio outputs, the method comprising:
    receiving, as part of a telecommunication connection, first voice data from a mobile phone, the first voice data corresponding to first speech;
    sending the first voice data to a wireless speaker for playback;
    receiving second voice data from a microphone array, the second voice data including a first representation of second speech;
    determining, using the second voice data, first processed data, the first processed data corresponding to a first direction and including a second representation of the second speech;
    determining, using the second voice data, a second processed data, the second processed data corresponding to a second direction and including a third representation of the second speech;
    determining a first signal to noise ratio of the first processed data;
    determining a second signal to noise ratio of the second processed data;
    determining that the first signal to noise ratio is greater than the second signal to noise ratio;
    generating, using the first processed data and the second processed data, first output data including a fourth representation of the speech;
    sending the first processed data to a server for performing speech recognition to determine and execute a command; and
    sending the first output data to the mobile phone as part of the telecommunication connection.

2. The computer-implemented method of claim 1, wherein generating the first output data further comprises:
    determining a sum of the first signal to noise ratio and the second signal to noise ratio;
    determining a first weight equal to the first signal to noise ratio divided by the sum;
    determining a second weight equal to the second signal to noise ratio divided by the sum;
    determining a first product of the first weight and the first processed data;
    determining a second product of the second weight and the second processed data; and
    generating the first output data by summing the first product and the second product.

3. The computer-implemented method of claim 1, further comprising:
    determining a third signal to noise ratio of the first processed data corresponding to a second frame;
    determining that the third signal to noise ratio is greater than the first signal to noise ratio;
    determining a second sum of the third signal to noise ratio and a fourth signal to noise ratio of the second processed data;
    determining a third weight equal to the third signal to noise ratio divided by the second sum;
    generating the first output data corresponding to the second frame using a third product of the third weight and the first processed data;
    determining a fifth signal to noise ratio of the first processed data corresponding to a third frame;
    determining that the fifth signal to noise ratio is less than the third signal to noise ratio;
    determining a fourth weight by multiplying the third weight by a constant; and
    generating the first output data corresponding to the third frame using a fourth product of the fourth weight and the first processed data.

4. The computer-implemented method of claim 1, wherein generating the first audio output signal further comprises:
    determining that the first signal to noise ratio is above a threshold;
    determining that a third signal to noise ratio of third processed data is above the threshold, the third processed data corresponding to a third direction and including a third representation of the second speech;
    associating a first weight with the first processed data and the third processed data;
    determining that the second signal to noise ratio is below the threshold;
    determining that a fourth signal to noise ratio of fourth processed data is above the threshold, the fourth processed data corresponding to a fourth direction and including a fourth representation of the second speech;
    associating a second weight with the second processed data and the fourth processed data, the second weight smaller than the first weight;
    determining a first product of the first weight and the first processed data;
    determining a second product of the second weight and the second processed data;
    determining a third product of the first weight and the third processed data;
    determining a fourth product of the second weight and the fourth processed data; and
    generating the first output data by summing the first product, the second product, the third product and the fourth product.

5. A computer-implemented method, comprising:
    capturing, using a microphone array, first voice audio data including a first representation of speech;
    determining, using the first voice audio data, first processed audio data, the first processed audio data corresponding to a first direction and including a second representation of the speech;
    determining, using the first voice audio data, second processed audio data, the second processed audio data corresponding to a second direction and including a third representation of the speech;
    determining a first signal metric associated with a first frame of the first processed audio data;
    determining a second signal metric associated with a first frame of the second processed audio data;

determining, based on the first signal metric, a first weight associated with the first frame of the first processed audio data;
determining, based on the second signal metric, a second weight associated with the first frame of the second processed audio data;
generating a first frame of first output audio data including a fourth representation of the speech, the first frame of the first output audio data including a first portion corresponding to the first frame of the first processed audio data based on the first weight and a second portion corresponding to the first frame of the second processed audio data based on the second weight;
sending the first frame of the first processed audio data to a first remote device; and
sending the first frame of the first output audio data to a second remote device.

6. The computer-implemented method of claim 5, further comprising:
determining a first smoothing value between zero and one;
determining a second smoothing value by subtracting the first smoothing value from one;
determining a previous frame of second output audio data, the previous frame of the second output audio data preceding a first frame of the second output audio data;
generating a first product by multiplying the first smoothing value and the previous frame of the second output audio data;
generating a second product by multiplying the second smoothing value and the first frame of the first output audio data; and
determining the first frame of the second output audio data by summing the first product and the second product.

7. The computer-implemented method of claim 5, further comprising:
determining that the first signal metric is greater than the second signal metric;
determining, based on the first signal metric, a first weight associated with the first frame of the first processed audio data;
determining, based on the second signal metric, a second weight associated with the first frame of the second processed audio data, the second weight smaller than the first weight; and
generating the first frame of the first output audio data by multiplying the first frame of the first processed audio data by the first weight and multiplying the first frame of the second processed audio data by the second weight.

8. The computer-implemented method of claim 7, further comprising:
determining a third signal metric associated with a second frame of the first processed audio data, the third signal metric larger than the first signal metric;
determining, based on the third signal metric, a third weight associated with the second frame of the first processed audio data, the third weight larger than the first weight;
generating a second frame of the first output audio data by multiplying the second frame of the first processed audio data by the third weight;
determining a fourth signal metric associated with a third frame of the first processed audio data;
determining that the fourth signal metric is smaller than the third signal metric;
determining, based on the third weight, a fourth weight associated with the third frame of the first processed audio data, the fourth weight smaller than the third weight; and
generating a third frame of the first output audio data by multiplying the third frame of the first processed audio data by the fourth weight.

9. The computer-implemented method of claim 7, further comprising:
determining a third signal metric associated with a second frame of the first processed audio data;
determining that the third signal metric is smaller than the first signal metric;
determining a decay parameter value between zero and one;
determining a first product by multiplying the first signal metric by the decay parameter value;
determining, based on the first product, a third weight associated with the second frame of the first processed audio data; and
generating a second frame of the first output audio data by multiplying the second frame of the first processed audio data by the third weight.

10. The computer-implemented method of claim 7, wherein determining the first weight further comprises:
determining a first value using a natural exponential function of the first signal metric;
determining a second value by adding one to the first value;
determining a first scale factor by taking a reciprocal of the second value;
determining a first raw weight value by multiplying the first scale factor by the first signal metric;
determining a second raw weight value by multiplying a second scale factor by the second signal metric;
determining a total raw weight value by summing at least the first raw weight value and the second raw weight value; and
determining the first weight by dividing the first raw weight value by the total raw weight value.

11. The computer-implemented method of claim 5, further comprising:
associating the first weight with a first plurality of digital signals, the first plurality of digital signals forming a first group and including the first processed data;
associating the second weight with a second plurality of digital signals, the second plurality of digital signals forming a second group and including the second processed data, the second weight smaller than the first weight;
determining the first portion of the first frame of the first output audio data by multiplying the first weight and the first frame of the first processed data; and
determining the second portion of the first frame of the first output audio data by multiplying the second weight and the first frame of the second processed data.

12. The computer-implemented method of claim 11, further comprising:
determining a first number of the first plurality of digital signals with which to associate the first weight;
determining the first number of highest signal metrics from a plurality of signal metrics;
determining that the first signal metric is included in the first number of the highest signal metrics;
associating the first weight with the first frame of the first processed audio data;

determining that the second signal metric is not included in the first number of the highest signal metrics; and
associating the second weight with the first frame of the second processed audio data.

13. The computer-implemented method of claim 11, further comprising:
determining that the first signal metric is above a threshold;
associating the first weight with the first frame of the first processed data;
determining that the second signal metric is below the threshold; and
associating the second weight with the first frame of the second processed data.

14. The computer-implemented method of claim 11, further comprising:
determining that a second frame of the first processed audio data was associated with the second weight, the second frame prior to the first frame;
associating the first frame of the first processed audio data with a first time constant;
determining a second time constant by subtracting the first time constant from one;
determining a second frame of the first processed audio data;
generating a first product by multiplying the first time constant and the second frame of the first processed audio data;
generating a second product by multiplying the second time constant and the first weight; and
determining the first portion of the first frame of the first output audio data by summing the first product and the second product.

15. A device, comprising:
at least one processor; and
a memory device including instructions operable to be executed by the at least one processor to configure the device to:
capture, using a microphone array, first voice audio data including a first representation of speech;
determine, using the first voice audio data, first processed audio data, the first processed audio data corresponding to a first direction and including a second representation of the speech;
determine, using the first voice audio data, second processed audio data, the second processed audio data corresponding to a second direction and including a third representation of the speech;
determine a first signal metric associated with a first frame of the first processed audio data;
determine a second signal metric associated with a first frame of the second processed audio data;
determine, based on the first signal metric, a first weight associated with the first frame of the first processed audio data;
determine, based on the second signal metric, a second weight associated with the first frame of the second processed audio data;
generate a first frame of first output audio data including a fourth representation of the speech, the first frame of the first output audio data including a first portion corresponding to the first frame of the first processed audio data based on the first weight and a second portion corresponding to the first frame of the second processed audio data based on the second weight;
send the first frame of the first processed audio data to a first remote device; and
send the first frame of the first output audio data to a second remote device.

16. The device of claim 15, wherein the instructions further configure the device to:
determine a first smoothing value between zero and one;
determine a second smoothing value by subtracting the first smoothing value from one;
determine a previous frame of second output audio data, the previous frame of the second output audio data preceding a first frame of the second output audio data;
generate a first product by multiplying the first smoothing value and the previous frame of the second output audio data;
generate a second product by multiplying the second smoothing value and the first frame of the first output audio data; and
determine the first frame of the second output audio data by summing the first product and the second product.

17. The device of claim 15, wherein the instructions further configure the device to:
determine that the first signal metric is greater than the second signal metric;
determine, based on the first signal metric, a first weight associated with the first frame of the first processed audio data;
determine, based on the second signal metric, a second weight associated with the first frame of the second processed audio data, the second weight smaller than the first weight; and
generate the first frame of the first output audio data by multiplying the first frame of the first processed audio data by the first weight and multiplying the first frame of the second processed audio data by the second weight.

18. The device of claim 17, wherein the instructions further configure the device to:
determine a third signal metric associated with a second frame of the first processed audio data, the third signal metric larger than the first signal metric;
determine, based on the third signal metric, a third weight associated with the second frame of the first processed audio data, the third weight larger than the first weight;
generate a second frame of the first output audio data by multiplying the second frame of the first processed audio data by the third weight;
determine a fourth signal metric associated with a third frame of the first processed audio data;
determine that the fourth signal metric is smaller than the third signal metric;
determine, based on the third weight, a fourth weight associated with the third frame of the first processed audio data, the fourth weight smaller than the third weight; and
generate a third frame of the first output audio data by multiplying the third frame of the first processed audio data by the fourth weight.

19. The device of claim 17, wherein the instructions further configure the device to:
determine a third signal metric associated with a second frame of the first processed audio data;
determine that the third signal metric is smaller than the first signal metric;
determine a decay parameter value between zero and one;
determine a first product by multiplying the first signal metric by the decay parameter value;

determine, based on the first product, a third weight associated with the second frame of the first processed audio data; and generate a second frame of the first output audio data by multiplying the second frame of the first processed audio data by the third weight.

20. The device of claim 17, wherein the instructions further configure the device to:

determine a first value using a natural exponential function of the first signal metric;

determine a second value by adding one to the first value;

determine a first scale factor by taking a reciprocal of the second value;

determine a first raw weight value by multiplying the first scale factor by the first signal metric;

determine a second raw weight value by multiplying a second scale factor by the second signal metric;

determine a total raw weight value by summing at least the first raw weight value and the second raw weight value; and determine the first weight by dividing the first raw weight value by the total raw weight value.

21. The device of claim 15, wherein the instructions further configure the device to:

associate the first weight with a first plurality of digital signals, the first plurality of digital signals forming a first group and including the first processed data;

associate the second weight with a second plurality of digital signals, the second plurality of digital signals forming a second group and including the second processed data, the second weight smaller than the first weight;

determine the first portion of the first frame of the first output audio data by multiplying the first weight and the first frame of the first processed data; and determine the second portion of the first frame of the first output audio data by multiplying the second weight and the first frame of the second processed data.

22. The device of claim 21, wherein the instructions further configure the device to:

determine a first number of the first plurality of digital signals with which to associate the first weight;

determine the first number of highest signal metrics from a plurality of signal metrics;

determine that the first signal metric is included in the first number of the highest signal metrics;

associate the first weight with the first frame of the first processed audio data;

determine that the second signal metric is not included in the first number of the highest signal metrics; and associate the second weight with the first frame of the second processed audio data.

23. The device of claim 21, wherein the instructions further configure the device to:

determine that the first signal metric is above a threshold;

associate the first weight with the first frame of the first processed data;

determine that the second signal metric is below the threshold; and associate the second weight with the first frame of the second processed data.

24. The device of claim 21, wherein the instructions further configure the device to:

determine that a second frame of the first processed audio data was associated with the second weight, the second frame prior to the first frame;

associate the first frame of the first processed audio data with a first time constant;

determine a second time constant by subtracting the first time constant from one;

determine a second frame of the first processed audio data;

generate a first product by multiplying the first time constant and the second frame of the first processed audio data;

generate a second product by multiplying the second time constant and the first weight; and determine the first portion of the first frame of the first output audio data by summing the first product and the second product.

* * * * *